(12) United States Patent
Feltrin

(10) Patent No.: US 11,267,281 B2
(45) Date of Patent: Mar. 8, 2022

(54) BICYCLE WHEEL RIM AND RELATIVE MANUFACTURING PROCESS

(71) Applicant: Campagnolo S.r.l., Vicenza (IT)

(72) Inventor: Mauri Feltrin, Nanto (IT)

(73) Assignee: CAMPAGNOLO S.R.L., Vicenza (IT)

( * ) Notice: Subject to any disclaimer, the term of this patent is extended or adjusted under 35 U.S.C. 154(b) by 536 days.

(21) Appl. No.: 16/209,477

(22) Filed: Dec. 4, 2018

(65) Prior Publication Data
US 2019/0168538 A1 Jun. 6, 2019

(30) Foreign Application Priority Data
Dec. 6, 2017 (IT) .................. 102017000140909

(51) Int. Cl.
| | |
|---|---|
| *B60B 5/02* | (2006.01) |
| *B29C 70/34* | (2006.01) |
| *B60B 21/06* | (2006.01) |
| *B60B 1/04* | (2006.01) |
| *B60B 21/02* | (2006.01) |

(Continued)

(52) U.S. Cl.
CPC ............... *B60B 5/02* (2013.01); *B29C 70/34* (2013.01); *B60B 1/003* (2013.01); *B60B 1/041* (2013.01); *B60B 1/043* (2013.01); *B60B 21/021* (2013.01); *B60B 21/025* (2013.01); *B60B 21/062* (2013.01); *B60B 21/064* (2013.01); *B60B 25/22* (2013.01); *B60B 2310/242* (2013.01); *B60B 2360/341* (2013.01); *B60B 2360/3412* (2013.01); *B60B 2360/3416* (2013.01); *B60B 2360/3418* (2013.01); *B60Y 2200/13* (2013.01)

(58) Field of Classification Search
CPC ....... B60B 5/02; B60B 21/025; B60B 21/062; B60B 1/043; B60B 1/044; B60B 1/045; B60B 1/046; B60B 1/047; B60B 1/048; B60B 2310/242; B60B 2360/341
See application file for complete search history.

(56) References Cited

U.S. PATENT DOCUMENTS

| | | | |
|---|---|---|---|
| 7,178,239 B2 | 2/2007 | Meggiolan et al. | |
| 7,377,595 B1* | 5/2008 | Okajima | B60B 21/023 |
| | | | 301/58 |
| 8,313,155 B2 | 11/2012 | Schiers | |

(Continued)

FOREIGN PATENT DOCUMENTS

| | | |
|---|---|---|
| DE | 10 2005 053 799 A1 | 5/2007 |
| DE | 10 2006 037 163 A1 | 2/2008 |

(Continued)

OTHER PUBLICATIONS

Italian Search Report and Written Opinion in Italian Application No. 102017000140909, dated Sep. 19, 2018, with English translation.

*Primary Examiner* — Kip T Kotter
(74) *Attorney, Agent, or Firm* — Volpe Koenig

(57) ABSTRACT

A bicycle wheel rim made at least partially of a stratified composite material comprising structural fibers incorporated in a polymeric matrix. At least one opening, which passes through at least one first layer of composite material, is provided and at least one spoke attachment hole, which passes through at least one second layer of composite material, is also provided. The spoke attachment hole is completely contained within the opening in the first layer. A related manufacturing process is also described.

12 Claims, 8 Drawing Sheets

US 11,267,281 B2

Page 2

(51) Int. Cl.
*B60B 25/22* (2006.01)
*B60B 1/00* (2006.01)

(56) References Cited

U.S. PATENT DOCUMENTS

| | | | |
|---|---|---|---|
| 9,724,959 B2 | 8/2017 | Meggiolan | |
| 2004/0139609 A1 | 7/2004 | Meggiolan et al. | |
| 2007/0102992 A1 | 5/2007 | Jager | |
| 2008/0265657 A1 | 10/2008 | Reuteler | |
| 2010/0090519 A1* | 4/2010 | Lin | B60B 21/04 |
| | | | 301/58 |
| 2011/0273001 A1* | 11/2011 | Poertner | B60B 5/02 |
| | | | 301/95.102 |
| 2013/0056136 A1 | 3/2013 | Schiers | |
| 2017/0267021 A1 | 9/2017 | Meggiolan | |

FOREIGN PATENT DOCUMENTS

| | | | | |
|---|---|---|---|---|
| DE | 102015104663 A1 * | 9/2016 | | B60B 5/02 |
| EP | 1386756 A2 * | 2/2004 | | B60B 1/041 |
| EP | 1 418 064 A1 | 5/2004 | | |
| EP | 1 475 246 A2 | 11/2004 | | |
| EP | 1 985 435 A1 | 10/2008 | | |
| EP | 2 422 959 A1 | 2/2012 | | |
| EP | 2463117 A1 * | 6/2012 | | B60B 5/02 |
| EP | 2 674 304 A1 | 12/2013 | | |
| EP | 3 219 509 A1 | 9/2017 | | |

* cited by examiner

BICYCLE WHEEL RIM AND RELATIVE MANUFACTURING PROCESS

CROSS REFERENCE TO RELATED APPLICATIONS

This application claims the benefit of Italian Patent Application No. 102017000140909, filed on Dec. 6, 2017, which is incorporated herein by reference as if fully set forth.

FIELD OF INVENTION

The invention relates to a bicycle wheel rim. The invention also relates to a process for manufacturing a bicycle wheel rim. The rim of the invention applies to wheels of the spoked type and of the lenticular or disc type, depending on what elements—structural and not—join the hub to the rim.

BACKGROUND

In a spoked wheel, the hub is joined to the rim by a plurality of thin, individually tensioned elements or spokes. In a lenticular wheel, a disc-shaped—though actually frusto-conically-shaped—element joins the hub to the rim on each side; spokes can anyway be provided for between the two disc-shaped elements to perform the structural function, or the spokes can be used only during a manufacturing step of the lenticular wheel, as described in EP 2674304 A1 and equivalent U.S. Pat. No. 9,724,959, incorporated herein by reference.

In all of the aforementioned types of wheel, the rim can be made in a variety of radial section shapes, under "radial section" a section, in the present description and in the attached claims, carried out through a half-plane having the axis of rotation of the rim as an origin being meant. In general, the radially inner region of the rim is suitably designed according to the type of coupling with the hub; the lateral regions of the rim are suitably designed for example according to whether a brake acting on the rim itself or a different braking system is provided for, and/or whether the wheel is of the lenticular or disc type or of other types; the radially outer region of the rim, which corresponds to the rolling zone of the wheel on the road surface in the normal use of the bicycle, is typically designed according to the type of tire or solid tire used.

In the present description and in the attached claims, unless otherwise indicated, the terms "outer" and "inner" refer to the radial direction of the rim, to indicate proximal and distal, respectively, with respect to the axis of rotation of the rim.

In general, modern rims are generically "perforated" or "box-like" elements, namely for weight reasons their section is not solid, following instead a curved or broken or mixed "polygonal" chain, possibly self-intersecting, so that the rim encloses one or more annular cavities, concentric with the rim itself. Along said line, the wall thickness of the rim can be constant or variable.

In the present description and in the attached claims, the expression "wall" is meant in a broad sense so as to encompass both a cylindrical wall—namely flat in a radial section of the rim—and a non-cylindrical wall, although typically extending on a surface of revolution; such expression is also meant in a broad sense so as to encompass both a wall that joins to other walls of the rim with a sudden change of curvature or according to a sharp angle and it is thus distinguishable therefrom, and a wall that joins to other walls without a sudden change of curvature or without forming a sharp angle and thus it is not clearly distinguishable therefrom.

The rim according to the invention is made at least partially of composite material comprising structural fibers incorporated in a polymeric material.

Bicycle rims made of composite material are known and are typically manufactured through compression moulding in the case of a thermosetting polymeric material and through moulding, also injection moulding, in the case of a thermoplastic polymeric material, with a variety of cross-sectional shapes, as described above.

Because the rim is associated with a hub to form a bicycle wheel typically through spokes—in some cases also in a lenticular wheel, as described above—a plurality of spoke attachment seats have to be made in the rim.

In the present description and in the attached claims, the expression "spoke attachment seat" is used in a broad sense, so as to encompass both a seat in which a spoke is directly inserted, for example provided with an enlarged head or with a threading, and a seat in which a nipple or other spoke attachment element is inserted.

The spoke attachment seats are made in the positions required by the spoke pattern of the particular wheel, namely according to the number of spokes, to their distribution along the circumference of the rim, to their position in the cross section of the rim, as well as to the direction taken up by each spoke, for example due to its radial or tangential attachment to the hub and/or the camber angle. Usually, the seats are made on a wall of the rim that is located in a radially inner region, or lower bridge of the rim.

In order to make the spoke attachment seats, in most known processes the rim is first moulded and then transferred to a perforation station where a machine is suitably programmed with the perforation data.

EP 2422959 A1 discloses a process for manufacturing a spoked bicycle wheel rim at least in part made of a composite material, comprising the steps of moulding a composite material comprising structural fiber incorporated in a polymeric material into the shape of at least part of a bicycle rim, and forming at least one spoke attachment seat in said at least one part of bicycle rim, wherein said step of forming at least one seat is carried out through displacement of structural fiber before said moulding step. The document also discloses a bicycle rim comprising a wall made of a composite material comprising structural fibers incorporated in a polymeric material and a plurality of spoke attachment seats, wherein at least one seat comprises a hole in said wall and at least one amassment of structural fibers in a neighbourhood of the hole. The spoke attachment seats are made using a pointed but not cutting tool, displacing the structural fibers of the composite material without cutting them. By making the seats substantially without removal of structural fiber, the holes are substantially devoid of sheared fibers and the rim is stronger, not incurring in the frequent problems of delamination and failure linked to the presence of sheared structural fiber at the seats, when obtained through cutting processes. The document also generically discloses the possibility of making one or more additional holes after moulding.

U.S. Pat. No. 8,313,155 also discloses a rim for a wheeled vehicle—as well as the relative method of fabricating—substantially comprised of a composite material including a polymeric matrix with at least one layer of reinforcement fibers of a predefined orientation, substantially extending from one edge of the layer to an opposing edge and having a plurality of spoke holes formed in situ during a molding operation, wherein the reinforcement fibers immediately adjacent to and surrounding the plurality of spoke holes curve around the periphery of the spoke holes to remain continuous in the circumferential direction of the rim. The choice of the composite material is carried out mainly based on the structural properties required by the rim, irrespective of the perforation process through displacement of structural fibers.

The Applicant has recognized that in some composite materials, due to the stresses transmitted by the tensioned spoke, at the edge of the spoke attachment hole cracks can form with consequent separation of the two lips of material adjacent to the crack, irrespectively of whether the hole is made through cutting of the fibers or without removal of structural fiber. The separation of the two lips can in turn affect the adjacent layers of composite material when the latter is a stratified composite material. In particular, in case of a material comprising unidirectional fiber, a material that is particularly useful for providing the rim with stability, cracks can form that spread parallel to the unidirectional fiber, therefore, since there is no structural fiber in the direction transversal to the crack, the material comprising unidirectional fiber opens in two and each lip can drag the adjacent layers with it, sometimes even leading to the delamination of the stratified composite material. Similar problems are observed in fairly "elastic" materials, which shrink next to the hole.

The technical problem at the basis of the invention is that of overcoming the aforementioned drawback.

SUMMARY

The present solution relates to a bicycle wheel rim made at least partially of a stratified composite material comprising structural fibers incorporated in a polymeric matrix. At least one opening passes through at least one first layer of the stratified composite material, and at least one spoke attachment hole passes through at least one second layer of the stratified composite material, and is completely contained in said at least one opening when looking in the direction of an axis common to said at least one opening and said at least one spoke attachment hole.

BRIEF DESCRIPTION OF THE DRAWINGS

The features and advantages of the present invention will become clearer from the following detailed description of some preferred embodiments thereof, made with reference to the attached drawings. The different features illustrated and described with reference to the individual configurations can be combined with one another as desired. In the following description, for the illustration of the figures, identical or similar reference numerals are used to indicate constructive or functional elements with the same function or analogous function. In the drawings.

DETAILED DESCRIPTION OF THE PREFERRED EMBODIMENTS

Figure 1:
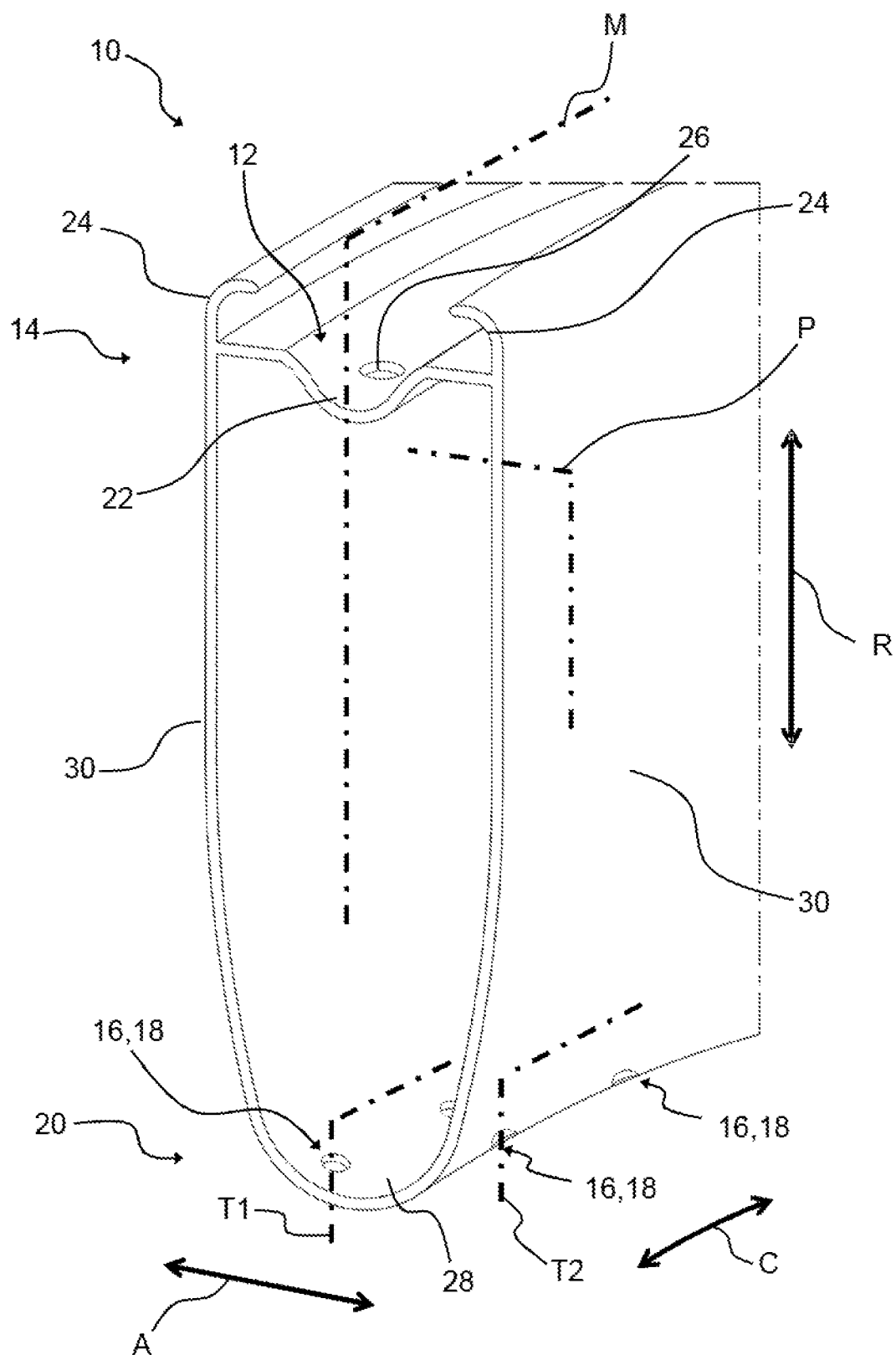
FIG. 1 schematically illustrates a perspective view of a portion of a bicycle wheel rim according to an embodiment of the invention, highlighting a radial section thereof.

In the present description and in the attached claims, under "stratified composite material comprising structural fibers incorporated in a polymeric matrix" a material formed by joining together, through the moulding process, two or more layers of starting material arranged at least partially on top of one another is meant to be indicated.

By making, in the critical layers of material, an opening that completely contains the hole, and therefore larger than the latter, the edges of the opening are not affected by the direct traction stresses of the spoke—and they can be instead made sufficiently far from the entire zone on which the stresses are distributed—and thus the critical layers of material, in particular those with unidirectional fiber, are less subject to the aforementioned formation of cracks, and in the stratified composite material the aforementioned problems of delamination and failure do not occur.

This provision can only be applied to those spoke attachment holes at which a high degree of tensioning of the spoke is foreseen, such as for example the spokes with higher camber angle; other spoke attachment holes, such as for example those for the spokes with smaller camber angle, can instead pass through all of the layers of composite material.

Preferably, said at least one second layer closes said at least one opening, apart from the hole.

In the rim zone involved by the hole, an opening passes through every first layer of composite material present in such a zone, and the hole passes through every second layer of composite material.

Preferably, at least one of said first layers is a continuous strip of composite material extending at least 360° about the rotation axis of the rim.

In the present description and in the attached claims, when there can be "at least one component", and therefore "only one component" or "a plurality of components", the expression "at least one of said components" is used for the sake of brevity to encompass both "said component" if only one component is present, and "at least one component of said plurality of components"; the expression should not therefore be interpreted as necessarily indicating "each component of said plurality of components". In such situations, the expression "each of said components" is used for the sake of brevity to encompass both "said component" if only one component is present, and "each component of said plurality of components".

In the present description and in the attached claims, under "strip" a piece of material of small thickness, with an extension in length that is considerably greater than that in width, is meant to be indicated. The term must not however be deemed to indicate a flat piece of material in the formed condition of the rim, rather in practice each strip shapes to match at least one part of the radial section of the rim while it is wound in the circumferential direction during the manufacturing of the rim, forming a surface of revolution having a curved generatrix.

Alternatively, at least one of said first layers can comprise plural strips of composite material adjacent to one another in the circumferential direction and joined together.

Said continuous strip and said plural strips can have a width equal to, less than or greater than that of other layers of the stratified composite material.

In some embodiments, similarly, at least one of said second layers is a continuous strip of composite material extending at least 360° about the rotation axis of the rim.

Such a second layer free of discontinuities in the circumferential direction advantageously closes all of the openings (apart from the holes) provided along the circumference of the rim. In fact, even if the spoke attachment holes are aligned along two (or more) circumferences, typically such circumferences are sufficiently close to each other so that two adjacent strips are not required to close the associated opening(s).

Said continuous strip can have a width equal to, smaller than, or greater than that of other layers of the stratified composite material.

Preferably, at the joint, the edges at the longitudinal ends of each strip (of the first or of the second layer(s)) overlap.

Preferably, the joint of a strip (of the first or second layer(s)) is in an angularly spaced position from the joint of a strip in an adjacent (first, second or other) layer in the stratified composite material.

In the same or in other embodiments, at least one of said second layers comprises at least one and preferably a plurality of patches, each configured to plug or close (apart from the holes) one or more openings in the at least one first layer.

In the present description and in the attached claims, under "configured for" in this context, "shaped, sized and positioned for" is meant.

In other words, in these embodiments, at least one of the second layers has at least one discontinuity in the circumferential direction, and extends less than 360° about the rotation axis of the rim.

Therefore, in the rim of the invention and as described in greater detail hereinafter, each opening is closed (apart from the holes) by a dedicated patch and/or by a patch shared with other openings and/or by a strip extending 360°. When there is more than one of such patches/strips, they are arranged in different second layers of the stratified composite material.

Preferably, at least one of and more preferably each of said openings is circular in shape.

Alternatively or in addition, at least one and preferably each of said openings is oblong-shaped, with a major size thereof aligned with or forming an angle of less than 45° with a circumferential direction of the rim.

More in general, the shape of each of said openings can be whatever and can have sharp or rounded corners, but it is preferably selected—individually—from the group consisting of circular, square, octagonal, rhomboidal, hexagonal, trapezoidal, oval, oblong.

In embodiments, at least one of and preferably each of said openings is configured to contain (and in fact contains) a single hole, again looking in the direction of the axis of the hole.

In the embodiments in which each opening is configured to contain a single hole, said openings are in a numerical ratio of 1:1 with said holes, when considering the rim as a whole, for example observing it from the outside in the radial direction and therefore neglecting possible differences between the number of first layers and the number of second layers. A specific hole can indeed be made in a number x of second layers and cross one or more respective openings in a number y, different from x, of first layers.

Alternatively or additionally, at least one of and preferably each of said openings is configured to contain (and in fact contains) plural holes, again looking in the direction of the axis of each hole.

In the embodiments in which each opening is configured to contain plural holes, said openings are in a numerical ratio of less than 1:1 with said holes, under the assumptions discussed above.

More preferably, the numerical ratio of less than 1:1 is 1:3 and said plural holes are three holes.

When the two provisions are both adopted, one or some openings contains/contain a single hole and another/other opening(s) contains/contain many holes.

Said plural holes can for example represent a group of spoke attachment holes in a spoke pattern of a grouped-spokes-type, namely wherein groups of spokes brought close to one another are provided, the distance between groups of spokes in the circumferential direction being greater than the distance between spokes of one same group.

In an embodiment, said at least one opening is an annular opening that extends 360° about the rotation axis of the rim, preferably substantially in the circumferential direction, and more preferably substantially astride of the median plane of the rim.

In the present description and in the attached claims, under "median plane" of the rim, a plane perpendicular to the rotation axis of the rim and passing through an axially intermediate point of the radially outer surface of the rim is meant to be indicated.

In this case, at least one of said first layers comprises two adjacent and spaced strips of composite material, each extending at least 360° about the rotation axis of the rim. Said annular opening is therefore formed by providing, as at least one of said first layers, a first and a second adjacent and spaced strips of composite material.

In this case, the annular opening comprises all of the spoke attachment holes, in particular aligned along a plane coinciding with or parallel to the median plane of the rim.

In the case of this embodiment, at least one of said second layers is in the aforementioned embodiment as a continuous strip.

Therefore, in a specific embodiment, said at least one opening is an annular opening that extends 360° about the rotation axis of the rim, preferably substantially in the circumferential direction, and more preferably substantially astride of the median plane of the rim, said at least one hole comprises a plurality of holes completely contained in the annular opening, and at least one of said second layers is a continuous strip of composite material extending at least 360° about the rotation axis of the rim.

Preferably, each opening extends in a region about the hole or holes contained in it.

The minimum extent of the region is preferably selected taking into account the fact that each opening must be sufficiently large so that its edges are sufficiently far from the region stressed by the tensioned spoke in the hole, but also sufficiently small as not to affect the structural characteristics provided to the rim by the first layer in which it is made.

Preferably, said region of the opening in each direction has a size proportional to the size of the hole in such a direction.

As briefly stated, each of said openings can be plugged by its own patch. In this case, the openings are in a numerical ratio of 1:1 with said patches, when considering the rim as a whole, for example observing it from the outside in the radial direction and therefore neglecting possible differences between the number of first layers and the number of second layers. A specific opening made in a specific first layer may indeed be closed only by one patch of a second layer or by plural patches of plural second layers. Vice-versa, a specific patch made in a specific second layer may close a single opening made in a first layer, or plural openings at least partially overlapping one another and made in plural first layers. It should be emphasized that the various first and second layers are not necessarily adjacent to one another, as better discussed hereinafter.

Alternatively or additionally, plural openings in one and the same first layer are closed by at least one shared patch. Seen from the opposite point of view, at least one patch is configured to close (and in fact closes, apart from the hole(s) in the patch itself) plural openings in one and the same first layer. Therefore, the patches are in a numerical ratio of less than 1:1 with the openings, under the simplifying assumptions discussed above.

More preferably, the numerical ratio of less than 1:1 is 1:3 and said plural openings are three openings.

Said plural openings can for example correspond to attachment holes of a group of spokes, in the case of a spoke pattern of the grouped-spokes-type.

When the two provisions are both adopted, in one and the same first layer some openings are each plugged by its own patch, and other openings are plugged by a shared patch.

In a specific embodiment, said at least one second layer comprises at least one patch that closes a respective opening in said at least one first layer, wherein a plurality of holes, preferably three, are made in each of said patches and completely contained in the respective opening.

In a specific embodiment, said at least one second layer comprises at least one patch that closes a respective opening in said at least one first layer, wherein a single hole is made in each of said patches and completely contained in the respective opening.

In a specific embodiment, said at least one second layer comprises at least one patch that closes plural respective openings in at least a same one of said first layers, wherein a plurality of holes, preferably three, are made in each of said patches and each completely contained in a different one of said plural respective openings.

When at least one first opening is sized to contain a plurality of holes, and at least one second opening is sized to contain a single hole, said at least one second layer can comprise at least one first patch configured to close said at least one first opening, as well as at least one second patch configured to close said at least one second opening; the number of holes contained in each patch will change according to the number of holes contained in every opening closed by the patch itself.

Preferably, at least one of and more preferably each of said patches is circular in-shape.

Alternatively or addition, at least one of and more preferably each of said patches is oblong-shaped, with a major size thereof aligned with or forming an angle of less than 45° with a circumferential direction of the rim.

More in general, the shape of each of said patches can be whatever and can have sharp or rounded corners, but it is preferably selected—individually—from the group consisting of circular, square, octagonal, rhomboidal, hexagonal, trapezoidal, oval, oblong.

In the various embodiments described above in which at least one of the second layers is provided in the form of a patch or of a plurality of patches, each configured to plug or close (apart from the holes) one or more openings in the at least one first layer, preferably at least one of and preferably each of said patches comprises a peripheral border that protrudes beyond said one or more openings closed by the patch, preferably in all directions.

Similarly, in the embodiments in which at least one of the second layers is provided in the form of a continuous strip, preferably at least one of and preferably each of said continuous strips comprises a peripheral border that protrudes beyond said openings closed by the continuous strip, preferably in both the directions transversal to the strip.

The patch or continuous strip therefore has a peripheral border that couples with a region of the at least one first layer surrounding said one or more openings.

Such a provision allows the patch or continuous strip of one of the second layers to adhere more stably to one or two of the adjacent first layers in the stratified composite material, preventing the patch or strip from collapsing into an opening during the perforation process and/or during the tensioning of the spoke(s) and/or the use of the rim.

In the case in which a patch is provided for at every opening, the patch therefore preferably has a greater size than the at least one opening.

In the case in which a patch or a continuous strip is provided at plural openings, it preferably has a greater size than a minimum imaginary surface that encloses all of the many openings.

It is, however, conceivable to make the border at opposite ends of the patch or continuous strip along a single direction, for example only at the longitudinal ends of an oblong patch.

Preferably, the peripheral border of the patch or continuous strip in each direction has a size proportional to the size of the opening or of the aforementioned imaginary surface in such a direction.

In yet other embodiments, each patch is made to fit a respective opening and is fixed inside the opening along the respective edges, for example with a gluing substance. In this case, the first layer and the second layer are on a same plane (in terms of geometric abstraction), while still being considered different layers of the stratified composite material since they are formed from a different material.

Preferably, said at least one first layer comprises plural first layers.

Preferably, said at least one second layer comprises plural second layers.

It should be emphasized that when the at least one first layer comprises more than one layer, each opening can be formed congruent in all of the first layers, but this is not strictly necessary.

In the present description and in the attached claims, under "congruent" and derived forms, the fact that two openings (or two holes) have substantially identical shape, size and positions in two different layers of material is meant to be indicated. Strictly speaking, since the overlapping layers are a different distance from the rotation axis, the size in the radially outermost layer is always slightly greater than the size in the radially innermost layer.

Indeed, it is possible to provide, in the various first layers, openings that are partially or totally offset, in one or more directions, purely as an example, two openings that are congruent in a direction perpendicular to the circumferential direction, but offset in the circumferential direction.

On the other hand, it should be emphasized that when the at least one second layer comprises more than one layer, every hole is formed at least nominally identical and in corresponding positions in all of the second layers, i.e. the holes pass through the entire stratified composite material, still possibly there being a certain size and/or positioning tolerance among the various layers.

Moreover, also in the case of a single first layer and/or of a single second layer, each possible axis of symmetry of an opening can coincide with the axis of the associated hole, or not, irrespective of the positioning of possible other axes of symmetry of the opening.

Similarly, each possible axis of symmetry of a patch can coincide with that of an associated opening or not, irrespective of the positioning of possible other axes of symmetry of the patch/opening.

In particular, it is possible to provide, in the various first layers, for openings that are offset, from one another and/or with respect to the hole, in a single direction, in plural directions or in all directions, purely as an example an opening coaxial with the hole in a direction perpendicular to the circumferential direction of the rim, but offset in the circumferential direction or vice-versa; again purely as an example, two congruent openings in a direction perpendicular to the circumferential direction of the rim, but offset in the circumferential direction or vice-versa.

For each layer of the stratified composite material, including said one or more first layers and said one or more second layers, there is a vast choice of materials, in general known as Sheet Moulding Compounds (SMCs).

As a non-limiting example, in the stratified composite material, each layer—including said one or more first layers and said one or more second layers—can be selected, independently from the other layers, from a composite material with unidirectional fiber, with woven bi-directional fiber, with non-woven bi-directional fiber, with woven multi-directional fiber, with non-woven multi-directional fiber, with short or very short fiber having random orientation, with conglomerates of fiber and combinations thereof; as well as independently from a composite material with preimpregnated fiber ("prepreg") and a composite material with dry fiber, the polymeric matrix material being added during the moulding process; as well as independently from a composite material with thermosetting polymeric matrix and a composite material with thermoplastic polymeric matrix; the choice in each group of possibilities being independent from the choice in each other group.

In the stratified composite material, each layer, including said one or more first layers and said one or more second layers, can comprise structural fibers oriented in the same or different way with respect to one or more other layers.

In this way, the possibilities to provide the desired resistance to stresses of different type and orientation are increased.

Typically, the structural fibers are selected, independently for each layer, from the group consisting of carbon fibers, glass fibers, boron fibers, synthetic fibers, ceramic fibers and combinations thereof.

Preferably, the synthetic fibers comprise polyoxazoline fibers, for example Zylon®, ultra-high molecular weight polyethylene fibers, for example Dyneema®, aramid fibers, for example Kevlar fibers, and combinations thereof.

In the stratified composite material, each layer, including said one or more first layers and said one or more second layers, can comprise structural fiber configured, in terms of material and/or density, in the same or different manner with respect to one or more other layers.

In an embodiment, at least one and more preferably each of said second layers of composite material has a lower density of structural fibers than said at least one first layer of composite material.

Preferably, in order to facilitate the perforation through displacement of the fibers, at least one and more preferably each of said second layers preferably has a fairly low fiber density, even more preferably it consists of a composite material comprising woven fibers with fairly large meshes.

The polymeric materials of all of the layers are preferably the same or at least compatible in terms of polymerization or setting pressure and temperature profile.

Preferably, at least one and more preferably each of said first layers of composite material comprises unidirectional structural fibers.

More preferably, said unidirectional structural fibers are aligned with a circumferential direction of the rim.

Preferably, at least one and more preferably each of said second layers of composite material comprises woven structural fibers, more preferably oriented at +/−45° with respect to the circumferential direction of the rim.

Preferably, at least one of said openings comprises an edge at which the structural fibers of the respective first layer are mainly sheared.

In the present description and in the attached claims, under "mainly sheared" it is meant to indicate that, with the exception of zones wherein the edge of the opening is tangent and/or parallel to a nominal direction of the fibers in the first layer, the fibers that face the edge of the opening are sheared.

The opening is in this case obtained through a benchtop cutting machine, or a portable cutting tool if it is formed inside the mould.

Preferably, at least one of said second layers has an amassment of structural fibers in a neighbourhood of said at least one hole.

In the present description and in the attached claims, under "neighbourhood" of a hole, a region extending about the hole having a size comparable to that of the hole itself, or even smaller than that of the hole, is meant to be indicated.

In this case, the hole is obtained through displacement of structural fiber, for example through a pointed, but not sharp tool as described in document EP 2422959 A1 cited above.

It should be emphasized that the spoke attachment hole is subject to dimensional precision constraints—because it must for example adapt well to the spoke or to the nipple for tensioning the spoke—and to manufacturing accuracy constraints. Moreover, when the hole is obtained through displacement of fiber, it is necessary to take care to shear the least possible number of fibers.

Thanks to the invention, such a hole is made in a second layer (or more)—whether it is a continuous strip or a patch—which is accessible through one (or more) opening in a first layer larger than the hole, said opening being subject to less precision and accuracy constraints with respect to the hole and thus being able to be made more easily in the various types of material.

Moreover, given that the hole is made only in the at least one second layer, in a zone at which the at least one first layer is cut out (and therefore absent), it is possible in such a zone to use a composite material having characteristics particularly suitable for the process of perforation through displacement of structural fiber, while in the remaining regions of the rim it is possible to use a composite material having characteristics such as to provide the desired resistance to mechanical stresses.

In particular, in order to facilitate the carrying out of the procedure of perforation through displacement of structural fiber, it may be advantageous for the composite material of the second layer(s) to have characteristics that are not necessarily recommended for making the other regions of the rim, devoid of holes.

Therefore, the rim of the invention also makes it possible to maximize the freedom of choice of the composite material most suitable for the regions of the rim comprising the spoke attachment holes, making it independent from the choice of the materials used in the remaining regions of the rim.

It is also possible, for example, to replace—during the arrangement of the composite material into the mould—a patch, in case the process of perforation through displacement has not been successful and the hole obtained on said patch is imprecise, without the need to replace the entire laminate of layers that will form the rim.

Preferably, the rim further comprises at least one access hole to nipples for tensioning the spokes in the aforementioned holes, and for at least one of such access holes everything stated above with reference to said at least one spoke attachment hole is valid.

Preferably, the rim further comprises a hole for the insertion of an inflation valve of a tire or of an air chamber of a wheel of which the rim is part, and for the latter hole everything stated above with reference to at least one spoke attachment hole is valid.

In another aspect, the invention relates to a process for manufacturing a bicycle wheel rim made at least partially of a stratified composite material comprising structural fibers incorporated in a polymeric matrix, comprising the steps, not necessarily in sequence, of:
  a) forming at least one through opening in at least one first layer of composite material,
  b) arranging said at least one first layer in a mould,
  c) arranging at least one second layer of composite material in a mould,
  d) forming at least one hole in said at least one second layer,
  with the proviso that, after all of the aforementioned steps have been carried out, each of said at least one hole—looking in the direction of an axis of the hole—is completely contained in at least one of said openings.

Preferably, the at least one second layer closes said at least one opening, apart from said at least one hole.

In said step a) the opening is formed through every first layer of composite material present in the zone of the rim involved by the hole, and in step d) the hole is formed through every second layer of composite material present in such a zone.

The process can further comprise the step e) of arranging at least one third layer of composite material in a mould.

Following the aforementioned steps, the material is suitably processed in a per se conventional manner, for example shaped and/or folded around inflatable cores so as to take up a certain shape, and is finally hardened, subjecting it to a suitable temperature and pressure profile to cross-link the thermosetting polymeric matrix, or cooling it in the case of a thermoplastic polymeric matrix.

Preferably, in said steps a) and c), said layers are of a pre-impregnated composite material.

Preferably, step b) is carried out after step a), but it can be carried out before step a), namely the openings can be formed in the first layer(s) even inside the mould.

Preferably, step d) is carried out after all of the other steps a), b), c), independently from the sequence of execution of the latter.

However, it is possible to carry out step d) even earlier, namely the holes can be formed in the second layer(s) even outside of the mould.

The aforementioned steps can be, as a whole, carried out so that at least one of said openings formed in said step a) contains a single respective hole formed in said step d).

Alternatively or additionally, the aforementioned steps are, as a whole, carried out so that at least one of said openings formed in said step a) contains a group or plurality of holes formed in said step d).

Preferably, the aforementioned steps are carried out as a whole so as to individually close or plug at least one of said openings formed in said step a), except for the respective hole(s).

Alternatively or in addition, the aforementioned steps are, as a whole, carried out so as to close or plug at least some of said openings formed in said step a) in groups, apart from the respective hole(s).

Preferably, step c) comprises arranging at least one and more preferably a plurality of patches in the mould, each at the intended position of at least one of said holes.

In the present description and in the attached claims, under the expression "intended position", the position foreseen for a given element not yet present in the rim in the manufacturing step under examination is meant to be indicated.

Preferably, said step b) comprises arranging a plurality of first layers in the mould, preferably but not necessarily in such a case said at least one opening being formed in step a) simultaneously and/or congruently in all of the first layers.

Preferably, said step c) comprises arranging a plurality of second layers in the mould, preferably but not necessarily in such a case said at least one hole being formed in step d) simultaneously and congruently in all of the second layers.

In embodiments, said steps b) and c) can take place simultaneously, preferably arranging at least one second layer sandwiched between two first layers and/or vice-versa.

By alternating the first layers and the second layers, advantageously the distance between different layers is equal to the thickness of a layer, and therefore the risk of formation of voids during moulding is low, and less sharp edges are created at the edges of the openings of the first layers.

Preferably, said step a) comprises cutting said at least one through opening in said at least one first layer.

In this case, after carrying out step a), each opening comprises an edge at which the structural fibers are mainly sheared.

Preferably, said step d) comprises displacing at least part of the structural fibers in a neighbourhood of said at least one hole without cutting them.

In this case, after carrying out step d) there is an amassment of structural fibers in a neighbourhood of the hole formed.

Preferably, step d) is in this case carried out by inserting a pointed, but not sharp tool through the structural fibers in said at least one second layer of composite material.

In another aspect, the invention relates to a bicycle wheel rim made at least partially of a stratified composite material comprising structural fibers incorporated in a polymeric matrix, wherein at least one opening passes through at least one first layer of composite material, each of said openings comprising an edge at which the structural fibers are mainly sheared, wherein at least one spoke attachment hole passes through at least one second layer of composite material, there being an amassment of structural fibers in the respective second layer(s) in the neighbourhood of each of said holes, wherein at least one of said holes—looking in the direction of an axis of the hole—is completely contained in at least one of said openings.

In another aspect, the invention relates to a process for manufacturing a bicycle wheel rim made at least partially of a stratified composite material comprising structural fibers incorporated in a polymeric matrix, comprising the steps, not necessarily in sequence, of:

a) cutting at least one through opening in at least one first layer of composite material, b) arranging said at least one first layer in a mould, c) arranging at least one second layer of composite material in a mould, d) forming at least one hole in said at least one second layer through displacing at least part of the structural fibers in a neighbourhood of said at least one hole without cutting them, with the proviso that, after all of the aforementioned steps have been carried out, each of said at least one hole—looking in the direction of an axis of the hole—is completely contained in at least one of said openings.

In another aspect, the invention relates to a bicycle wheel rim made at least partially of a stratified composite material comprising structural fibers incorporated in a polymeric matrix, wherein at least one opening passes through at least one first layer of composite material comprising unidirectional structural fibers, wherein at least one spoke attachment hole passes through at least one second layer of composite material comprising bi-directional or multi-directional structural fibers, wherein at least one of said holes—looking in the direction of an axis of the hole—is completely contained in at least one of said openings.

In another aspect, the invention relates to a process for manufacturing a bicycle wheel rim made at least partially of a stratified composite material comprising structural fibers incorporated in a polymeric matrix, comprising the steps, not necessarily in sequence, of:

a) forming at least one through opening in at least one first layer of composite material comprising unidirectional structural fibers, b) arranging said at least one first layer in a mould, c) arranging at least one second layer of composite material comprising bi-directional or multi-directional structural fibers in a mould, d) forming at least one hole in said at least one second layer, with the proviso that, after all of the aforementioned steps have been carried out, each of said at least one hole—looking in the direction of an axis of the hole—is completely contained in at least one of said openings.

Preferred features of these other aspects of the invention correspond to those described above for the first two aspects.

Reference in made now to the drawings where FIG. 1 shows a portion, in particular a circular sector, of a bicycle wheel rim 10 according to an embodiment of the present invention, with a radial section highlighted. FIG. 1 indicates the axial direction A, the circumferential direction C, the radial direction R, the median plane M of the rim 10, and a radial section half-plane P.

When mounted in a bicycle wheel, the rim 10 is connected to a hub (not shown) through spokes (not shown) and a tire (not shown) is typically mounted thereon. Typically, the rim 10 has a hole (not shown) for the insertion of an inflation valve (not shown) of the tire or of the air chamber.

In the case illustrated, the rim 10 is of the type defined as perforated or box-like above, therefore configured like a hollow annular element, roughly annulus-shaped.

In the case of the specific radial section shown, the tire is mounted in a tire-coupling channel 12 defined in a radially outer region 14 of the rim 10. The spokes have respective radially outer ends seated in respective spoke attachment seats 16, each comprising in particular a spoke attachment hole 18, formed in a radially inner region 20 of the rim 10.

The tire-coupling channel 12 is delimited by a bottom 22 and by two lateral flanges 24 projecting outwards—in a generically radial direction R—from the bottom 22 of the channel 12 and folded towards one another so as to form undercut regions for holding the beads (or bead wires) of the tire. On the bottom 22 of the tire-coupling channel 12, openings 26 for access to the spoke attachment seats 16 are made, which allow the spokes and/or suitable fixing means—typically nipples—thereof to be inserted or removed.

The spoke attachment seats 16 are formed in a wall 28—sometimes called "lower bridge" in the field—of the radially inner region 20 of the rim 10. As described in the introductory part, such a wall 28 typically extends on a surface of revolution, and can have a more or less cylindrical shape. In the specific example shown, the wall 28 has, in cross section, a slightly arched shape with concavity radially outwards, but at least the central region thereof, involved by the holes 18, can be considered to generically extend in a substantially axial direction A.

Side walls 30 join the channel 12 to the wall 28.

The rim 10 could have further stiffening partition walls, in a per se well known way.

The rim 10 of FIG. 1 is particularly well suited to wheels with an air chamber, but it should be understood that the invention also applies to rims for tubeless wheels and for wheels with tubular tires, the changes to be brought to the rim 10 being within the capabilities of those skilled in the art. The shape in radial section of the illustrated rim 10 is indeed purely indicative and in practice it can change even substantially.

In the case of a tubeless tire, for example, the openings 26 on the bottom 22 of the channel 12 are plugged up in a subsequent processing step, for example by gluing or molding a strip (not shown) of composite material onto the bottom 22 of the channel 12, or such openings 26 are absent, using a magnet for the insertion of the nipples as described in document EP 1418064 A1 and corresponding US 2004/0139609 A1, now U.S. Pat. No. 7,178,239.

The number of seats 16—as well as openings 26 for access to such seats 16, where provided for—, their distribution along the circumferential direction C, as well as their alignment at or with respect to the median plane M of the rim 10 can change according to the type of wheel of which the rim 10 is part, for example based on the type of spoke pattern and the camber angle. In particular, there can be a number of seats 16 on a first side with respect to the median plane M that is different from the number of seats 16 on a second side, opposite the first, with respect to the median plane M.

The seats may or may not be equidistant from one another in the circumferential direction.

The holes 18 can have a respective axis slightly skew with respect to the radial direction, to facilitate the arrangement of the spokes according to the desired camber angle.

In particular, as shown schematically in FIG. 1, preferably the spoke attachment seats 16 associated with spokes extending between the rim 10 and a first flange on a first side of the hub (not shown) are aligned at a plane T1 parallel to the median plane M, and the spoke attachment seats 16 associated with spokes extending between the rim 10 and a second flange on a second side of the hub are aligned at a plane T2 parallel to the median plane M.

In other cases, the seats 16 can, alternatively or additionally, be aligned along the median plane M.

In other types of rim, the spoke attachment seats 16 can be made on the bottom 22 of the channel 12 and corresponding openings, in this case for the passage of the spokes, can be made in the wall 28 or lower bridge of the rim 10, in an analogous way to what is described in document EP 3 219 509 A1 and corresponding US 2017/0267021 A1.

As discussed in the introductory part, the rim of the invention can be intended for a spoked wheel as shown in FIG. 1, but also for a lenticular or disc-type wheel.

The rim 10 of the invention is made of a layered composite material comprising structural fibers incorporated in a polymeric matrix, which as described earlier is formed by joining together, through a compression or injection moulding process, two or more layers of starting material, arranged at least partially on top of one another.

Alternatively, the rim 10 could comprise a radially outer rim component made of metal material, only the radially inner region 20 being made of composite material. For the purposes of the present invention, it is even sufficient for only the wall 28 (or in other embodiments only the bottom 22 of the channel 12) where the spoke attachment seats 16 are made, to be made of composite material.

In particular, each layer can be present in all of the regions of the rim indicated above or only in some of such regions of the rim 10, or even only in some specific zones, so as to provide each zone or region of the rim 10 with a suitable wall thickness. And, this is not necessarily obtained uniformly along the entire circumferential direction C—namely not all of the radial sections of the rim 10 are necessarily identical to one another.

For each layer it is possible to individually select, in a way in general known by a person skilled in the art, and the specific provisions disclosed here still holding true, the most suitable starting material among the vast range of composite materials, regarding which, like regarding the selection criteria within such a range, reference should be made to the previous description, and the fiber contained in a specific starting material can be oriented in the rim 10 in the most suitable way, so as to give each zone or region of the rim 10 an adequate strength in the various axial A, circumferential C and radial R directions.

Figure 10:
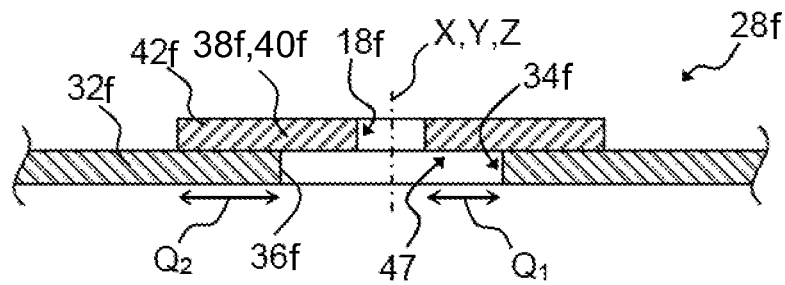
FIGS. 10-14 are further schematic section views at a spoke attachment hole of the rim of FIG. 1, according to various embodiments.
Figure 11:
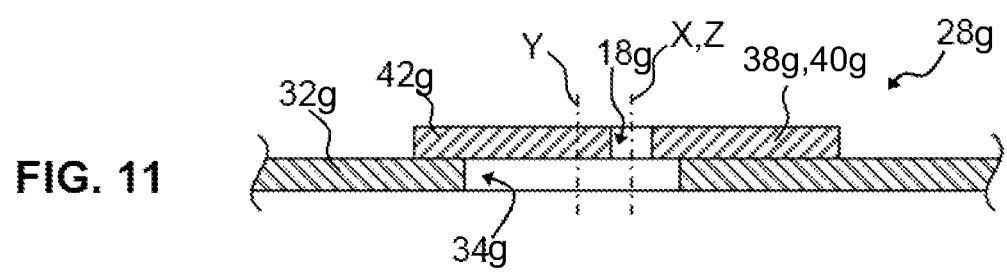
Figure 12:
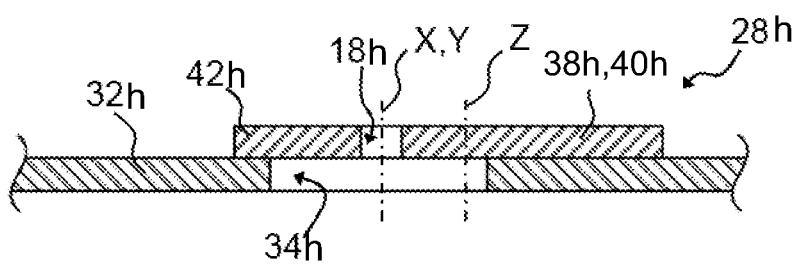
Figure 13:
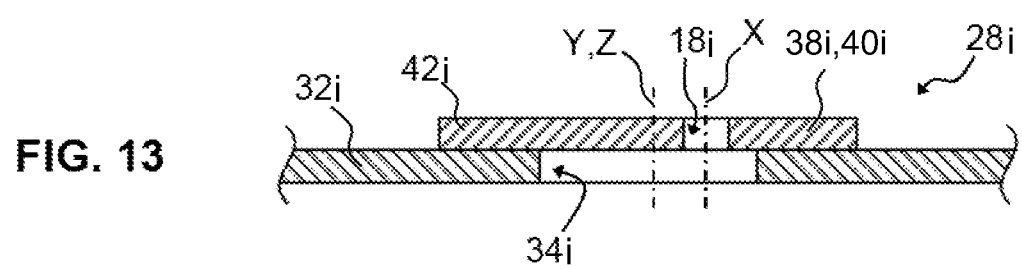
Figure 14:
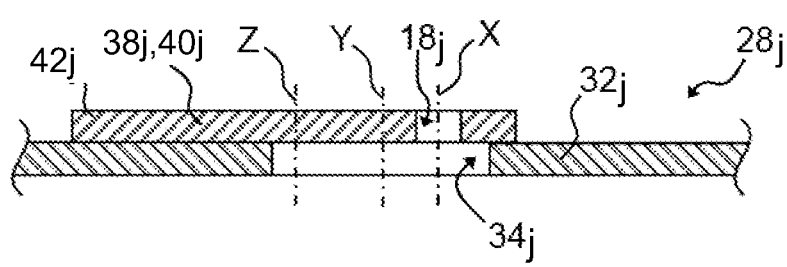
Figure 15:
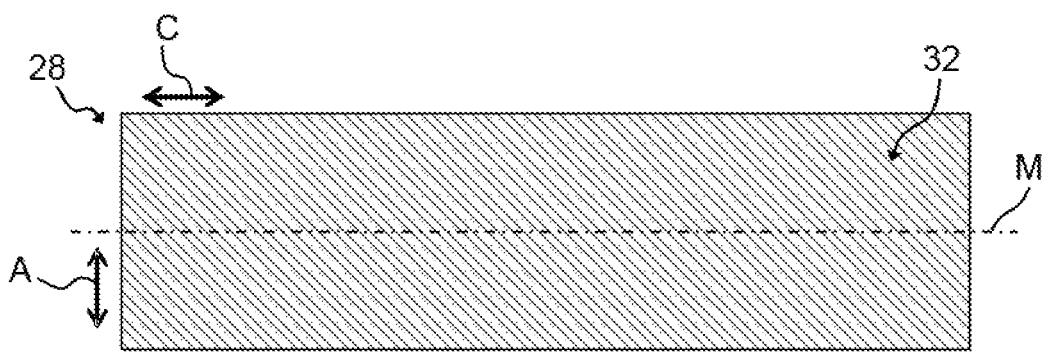
FIGS. 15-18 are schematic views of a portion of an embodiment of the rim of FIG. 1 during different steps of an embodiment of a process for manufacturing it.
Figure 24:
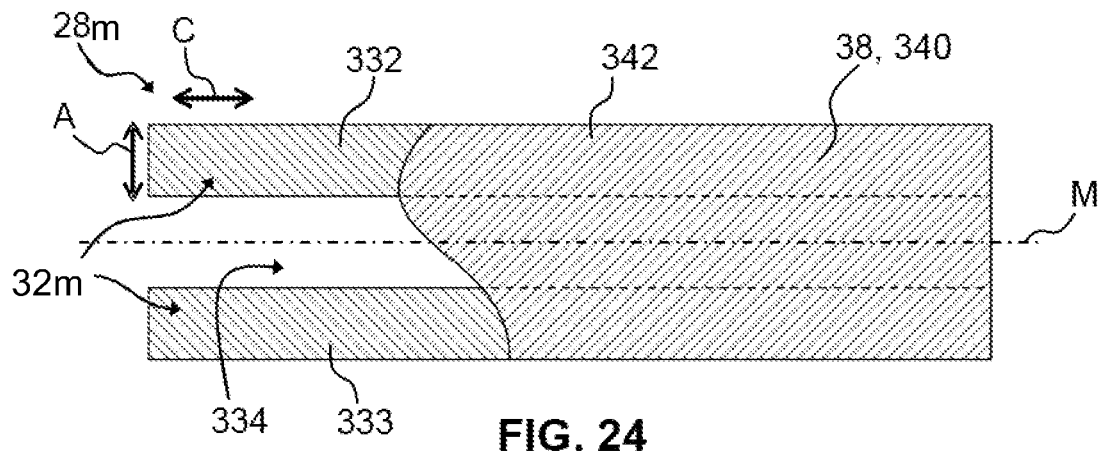
FIGS. 24-25 are schematic views of a portion of another embodiment of the rim of FIG. 1 during different steps of an embodiment of a process for manufacturing it.
Figure 25:
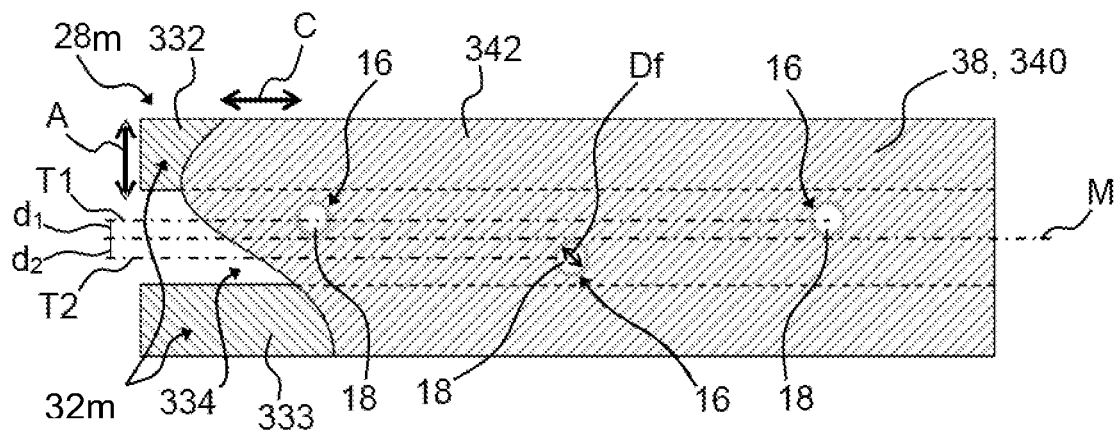

Reference numerals or characters for elements that are functionally equivalent but in different Figures or with alternative structures are identified with varying suffixes, such as "a" (FIG. 3), "b" (FIG. 4), "c" (FIG. 5), "d" (FIG. 6), "e" (FIG. 7), "f" (FIG. 10), "g" (FIG. 11), "h" (FIG. 12), "i" (FIG. 13), "j" (FIG. 14), "k" (FIGS. 19 and 20), "l" (FIGS. 21 and 22), and "m" (FIGS. 24 and 25).

The various layers are not distinguishable in FIG. 1, but the stratified configuration is recognizable in FIGS. 2-7, which are totally schematic and out of scale views through a region of the wall 28 of the rim 10 involved by a spoke attachment hole 18, according to different embodiments of the invention. Such figures are representative in general of any axial section of the hole 18, except for details not shown that will be clear to those skilled in the art in the light of the present description. Therefore, the axial section of the hole 18 can be considered taken in a radial section plane of the rim 10 (cf. the plane P of FIG. 1), in a transversal section plane of the rim 10 (cf. the planes M, T1, T2 of FIG. 1), in another section plane containing the axis X of the hole 18, which as stated above for the sake of simplicity is considered perpendicular to the wall 18.

In the various schematic views of FIGS. 2-7 and thereafter, the wall 28 of the rim is represented as if it were flat, while in practice each layer shapes to match at least one segment of the radial section of the rim 10 while it is wound for a certain length in the circumferential direction C during the manufacturing of the rim, forming a surface of revolution having curved generatrix; in other words, the wall 28 actually typically has a double curvature, not shown in FIGS. 2-7.

Figure 5:
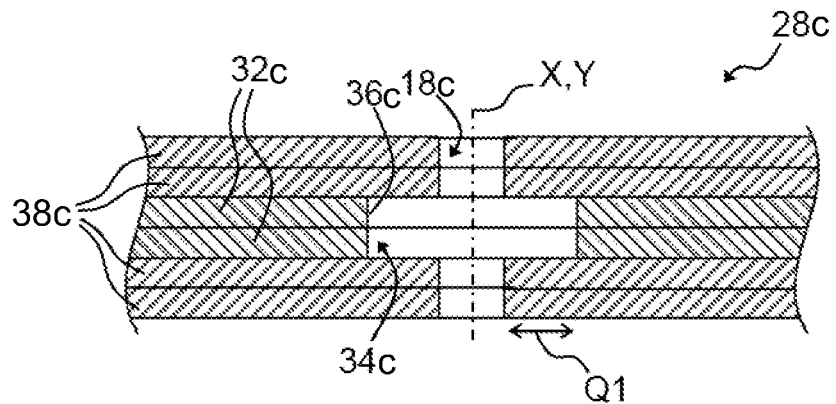
Figure 6:
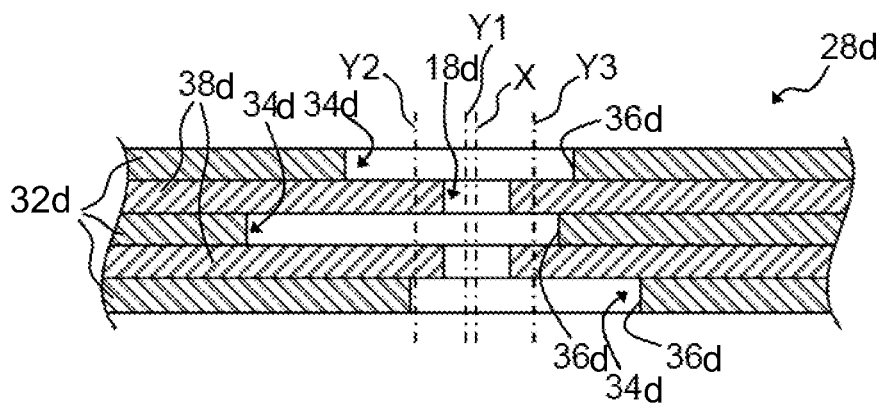
Figure 7:
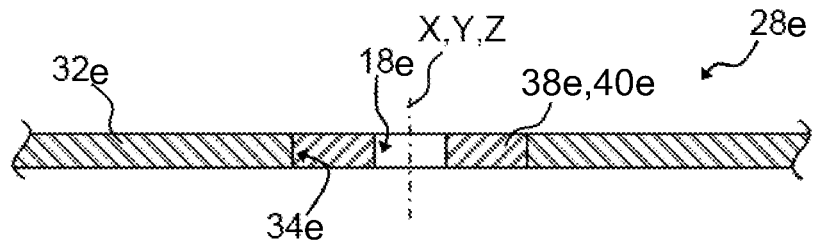

FIGS. 2-7 show in particular first layers 32 and second layers 38 of the stratified composite material of the rim 10 and highlight that, in the area of the rim 10 involved by the hole 18, an opening 34 passes through every first layer 32 of composite material present in such a zone, the hole 18 passes through every second layer 38 of composite material, and the hole 18 is completely contained in the openings 34, at least looking at it in the direction of the axis X of the hole 18 and neglecting the fact that holes 18 and openings 34 are made in different planes (except in FIG. 7).

The first layers 32 are those which have the criticalities discussed in the introductory part, i.e. in which making the spoke attachment hole 18 is problematic, for example due to a high risk of formation of cracks. The second layers 38 are those that do not have such criticalities.

By making, in the critical first layers 32, an opening 34 that completely contains the hole 18, and therefore larger than the latter, the edges of the opening 34 are not affected by the direct traction stresses of the spoke—and rather can be made sufficiently far from the entire zone on which the stresses are distributed—and therefore the first layers 32 are less subject to the aforementioned formation of cracks, and in the stratified composite material the aforementioned problems of delamination and failure do not occur.

In preferred embodiments, the first layer 32 or at least some of the first layers 32 comprises/comprise unidirectional structural fibers, which more preferably are aligned with the circumferential direction C of the rim 10.

In the same or in other preferred embodiments, the second layer 38 or at least one of the second layers 38 comprises/comprise woven structural fibers, which more preferably are oriented at +/−45° with respect to the circumferential direction C.

As better described hereinafter, preferably at the edge 36 of the opening 34 or of at least one of them, the structural fibers of the first layer 32 are mainly sheared, as can be verified by making an opening through a cutting edge of a benchtop or portable tool.

Vice-versa, as better described hereinafter, preferably, at least one of said second layers 38 has an amassment of structural fibers in a neighbourhood of the hole 18, as can be verified by forming the hole 18 through displacement of structural fiber, for example through a pointed, but not sharp tool as described in document EP 2422959 A1 cited above (cf. the following figures).

Figure 8:
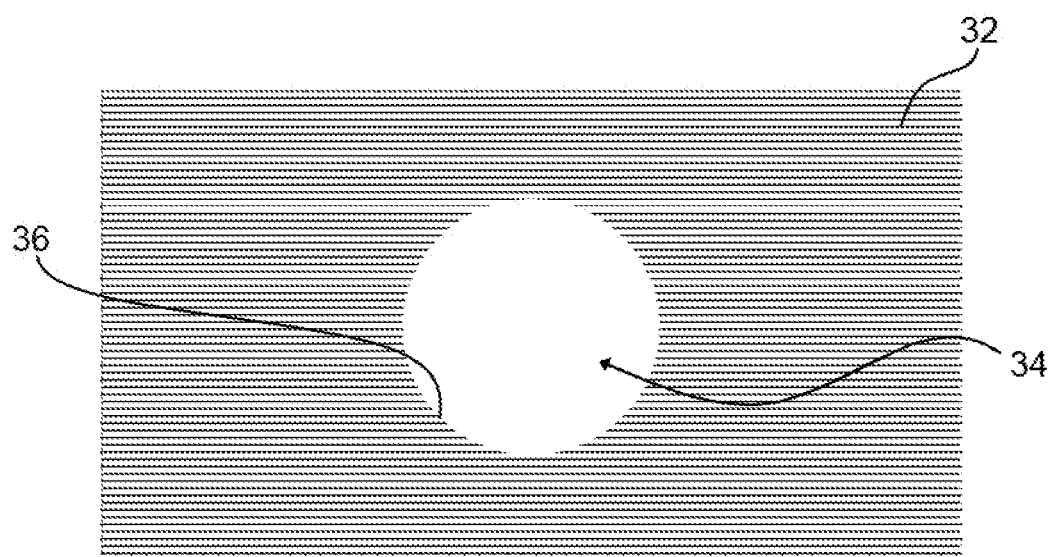
FIG. 8 is a schematic representation of an opening made in a layer of the composite material of the rim of FIG. 1, according to an embodiment.
Figure 9:
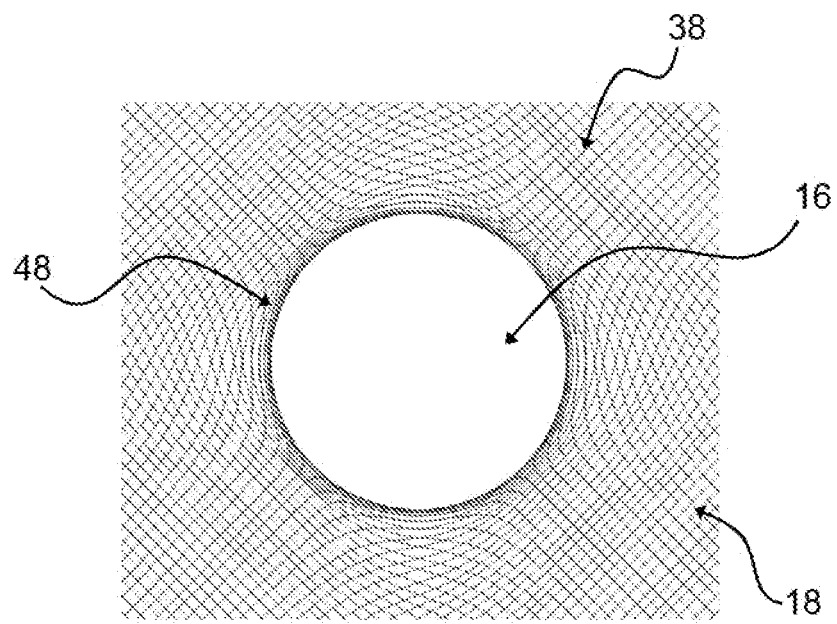
FIG. 9 is a schematic representation of a hole made in a layer of the composite material of the rim of FIG. 1, according to an embodiment.

Purely as a non-limiting example, FIGS. 8-9 respectively show, in a totally schematic manner, an opening 34 with sheared edges formed in a material with woven bi-directional fiber, and a hole 18 with amassment 48 of structural fibers in its neighbourhood formed in a material with unidirectional fiber.

As is clear in FIG. 8, along the edge 36 of the openings 34 there is a predominance of sheared fibers and possibly only a small percentage of intact fibers, essentially only in the portions of the edge 36 at which the unidirectional structural fibers of the first layer 32 are substantially tangent to the edge 36 of the openings 34, namely in the uppermost portion and in the lowermost portion of the edge 36 of the opening 34.

It should be emphasized that the use of these advantageous technologies of formation of the holes 18 and of the openings 34 is allowed or at least facilitated by the fact that the hole 18 is formed in first layers 32, but not in second layers 38 since these are cut out in the position corresponding to the hole 18.

FIGS. 2-7 also show that the openings 34, larger than the hole 18, extend generically in a region 47 about the hole 18.

It should also be noted that the second layers 38 completely close the openings 34, apart from the hole 18 itself. The "free" regions 46 (the reference numeral being indicated only in FIG. 2 for clarity) of the second layers 38, where the first layers 32 are absent, are also manifest.

In FIGS. 2-7, possible other or "third" layers have been omitted, which can on the other hand be present in the or some zones not involved by the hole 18 in the stratified composite material.

In particular, the first layers 32 and the second layers 38 can have a width equal to, less than or greater than that of other layers of the stratified composite material.

The radially outer face of the wall 28 can be both the one shown at the top in FIGS. 2-7, and the one shown at the bottom. In other words, the various layers can be arranged in the mutual position shown if considering a radial section of the rim 10 taken above the rotation axis A, considered substantially horizontal, or if considering a radial section of the rim 10 taken below the rotation axis A, considered substantially horizontal. In still other words, the layer shown at the bottom in FIGS. 2-7 can represent the one that is laid first in the mould during the manufacturing process (and which forms the radially inner layer of the wall 28), but, vice-versa, it can represent the one that is laid last in the mould.

Figure 2:
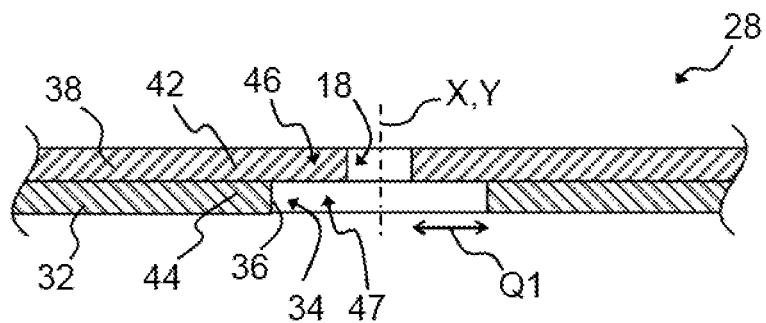
FIGS. 2-7 are schematic section views at a spoke attachment hole of the rim of FIG. 1, according to various embodiments.

In detail, in the embodiment of FIG. 2, a rim 10 is shown in which there is a single first layer 32 in which an opening 34 is formed and a single second layer 38 in which the hole 18 is formed.

The axis of symmetry Y of the opening 34 in the plane of the figure is shown coinciding with the axis X of the hole 18 (the two are coaxial), whereby the opening 34 extends beyond the hole 18 in a region 47 of size Q1 equal on the two sides.

This, however, is not a necessary condition. Particularly, it is not at all necessary for such symmetry of the opening 34 and/or coaxiality between hole 18 and opening 34 to be present in any plane containing the axis X of the hole 18.

Even if FIG. 2 (like the subsequent ones) is a laterally interrupted view, it can still be seen that the second layer 38 extends beyond the edge 36 of the opening 34, it being possible to identify a peripheral border 42 that protrudes beyond the opening 34.

Such a peripheral border 42 couples with a region 44 of the first layer surrounding the opening 34, allowing the second layer 38 to adhere more stably to one or two of the adjacent first layers 32 in the stratified composite material, and preventing it from collapsing into the opening 34 during the perforation process and/or during the tensioning of the spoke(s) and/or the use of the rim.

Figure 3:
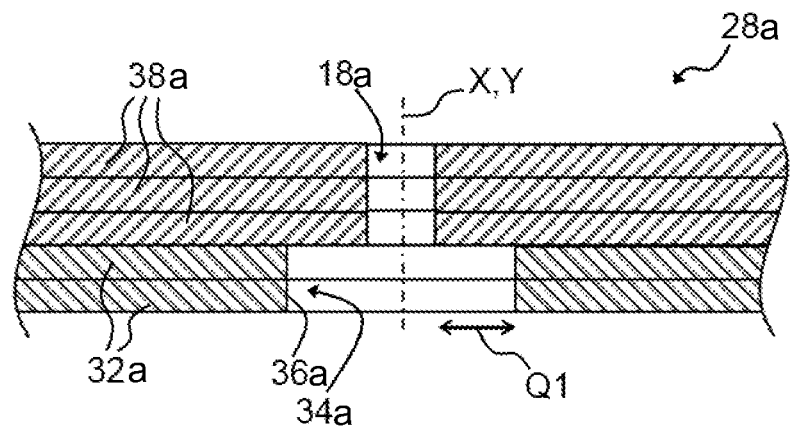

In the embodiment of FIG. 3, the rim 10 comprises a plurality of first layers 32 (two by way of an example) adjacent to one another, and a plurality of second layers 38 (three by way of an example) adjacent to one another in the stratified composite material.

Figure 4:
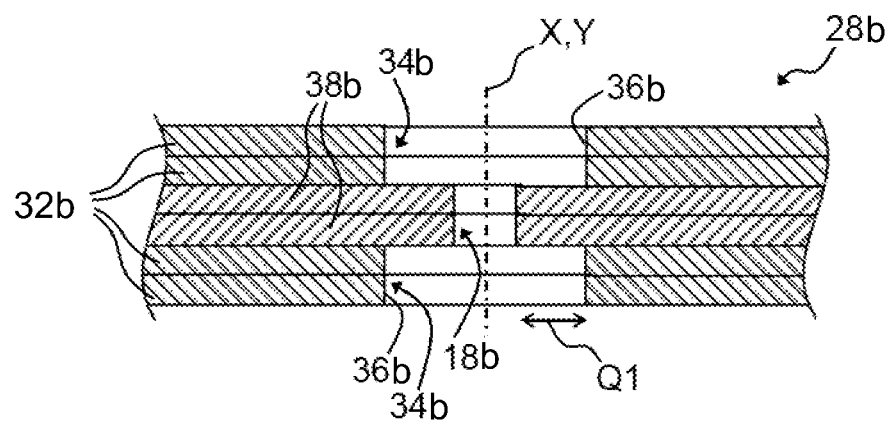

In the embodiment of FIG. 4, the rim 10 comprises a plurality of first layers 32 (four by way of an example) and at least one second layer 38 (two by way of an example) sandwiched between one or more (two as an example) of the first layers 32 and another or plural others (two by way of an example) of the first layers 32.

The number of first layers 32 on the two sides of the second layer(s) 38 is not necessarily the same.

In a dual manner, in the embodiment of FIG. 5, the rim 10 comprises a plurality of second layers 38 (four by way of an example) and at least one first layer 32 (two by way of an example) sandwiched between one or more (two by way of an example) of the second layers 38 and another or plural others (two by way of an example) of the second layers 38.

The number of second layers 38 on the two sides of the first layer(s) 32 is not necessarily the same.

In each of FIGS. 3-5, the various openings 34 are all congruent, in the aforementioned meaning of the term.

In the embodiment of FIG. 6, the rim 10 comprises a plurality of first layers 32 (three by way of an example) and a plurality of second layers 38 (two by way of an example) alternating with each other.

In the case shown, there are more first layers 32 than second layers 38, but they could be in equal number or they could be less. Furthermore, instead of alternating one by one, there could also be two or more homologous layers (i.e. first layers 32 or second layers 38) in one or more positions in the alternate layering.

In FIG. 6 the three openings 34 are not congruent, rather are offset from one another, cf. the axes Y1, Y2, Y3.

Furthermore, none of the three openings 34 is coaxial with the hole 18, but one of them could be, in other words at least one opening 34 could be symmetrical with respect to the axis X.

The three openings 34 are shown as having different size, but they could have the same size, as shown indeed in the other embodiments.

When there are two or more openings 34, each can be sized and positioned independently of the others, provided that the hole 18 remains completely contained in all of the openings 34 associated therewith.

More in general, the various types of stratification and the various sizes and positions of the openings 34 and the various positions of the openings 34, with respect to the hole 18, can be combined with each other as desired, arriving at mixed embodiments between two or more of those shown in FIGS. 2-6.

The rim 10 of the embodiment of FIG. 7 differs from that of FIG. 2 in that the first layer 32 and the second layer 38 are on the same plane (in terms of geometric abstraction), even though they are considered different layers of the stratified composite material since they are formed from a different material. The second layer 38 is in the form of a patch 40 made to fit the opening 34 and fixed inside the opening 34 along the respective edges, for example with a gluing substance.

In this case, therefore, the second layer 38 does not extend beyond the edge 36 of the opening 34 and does not have any peripheral border 42 that protrudes beyond the opening 34.

Such a patch of second layer 38 made to fit can also be provided inside the opening 34 of any one—or more than one—of the first layers 32 of the various embodiments of FIGS. 2-6 and respective variants and combinations.

The mutual arrangement of holes 18 and openings 34 can be the same considering two or more axial sections of the hole 18, or different. In particular, it is possible to provide, in the various first layers 32, openings 34 that are offset, from one another and/or with respect to the hole 18, in a single direction, in plural directions or in all directions, purely as an example an opening 34 coaxial with the hole 18 in a direction perpendicular to the circumferential direction C of the rim, but offset in the circumferential direction C or vice-versa; again as an example, two openings 34 that are congruent in a direction perpendicular to the circumferential direction C of the rim, but offset in the circumferential direction C or vice-versa.

Furthermore, the size of the openings 34 in the various first layers 32 can be the same or different.

FIGS. 10-14 illustrate schematically, and by way of an example, that when an opening 34 is closed by a patch 40 not made to fit, rather provided with a border 42, the mutual position of opening 34 and patch 40 may also be coaxial (FIGS. 10, 13) or offset (FIGS. 11-12, 14); furthermore, the position of the hole 18 in the patch 40 may also be centered (FIGS. 10, 11) or not (FIGS. 12, 13, 14); the two selections being independent from one another.

When opening 34 and patch 40 are coaxial, cf. the respective axes Y and Z, the border 42 of the patch 40 has the same size on the two opposite edges of the opening 34, when they are not, it has different sizes. And, this is valid in each direction independently, as well as independently from the geometric relationship between hole 18 and patch 40 and/or between hole 18 and opening 34.

On the other hand, it should be emphasized that when there is more than one second layer 38, like in the embodiments of FIGS. 3-6 and combinations, variants and generalizations thereof, every hole 18 is formed at least nominally identical and in corresponding positions in all of the second layers 38, i.e. the holes 18 are congruent and pass through the entire stratified composite material of the rim 10, it still being possible for there to be a certain dimensional and/or positioning tolerance among the various second layers 38.

However, the holes 18 can be made in all of the second layers 38 before they are positioned in the mould, but preferably they are made after positioning has taken place.

As already stated in the introductory part of the present description, the openings 34 in the first layers 32 are not necessarily provided at every spoke attachment hole 18 provided for in the rim 10. For example, it is possible to provide them only for those spoke attachment holes at which a high degree of tensioning of the spoke is foreseen, like for example only for the holes aligned along the plane T1, provided for spokes having higher camber angle, but not for the holes aligned along the plane T2, provided for spokes having lower camber angle; and/or alternately for one hole yes (or more than one) and one hole no (or more than one) in the circumferential direction C; and/or only for one (or more) holes provided for a respective enlarged spoke for compensating for the weight of the valve or another localized weight along the circumferential direction C; and/or based on other criteria.

Moreover, in most cases the particularly tensioned and/or enlarged spokes are more than one in number and the respective holes 18 are, sometimes, in fairly close positions.

Hereinafter, various possibilities of implementing the invention with reference to more than one hole 18 are described in further detail, with reference to FIGS. 15-24. Some features of the invention are at the same time repeated or further clarified.

Such figures are schematic views, in a substantially radial direction R and not to scale, of a region of the wall 28 of the rim involved by three spoke attachment holes 18, during some manufacturing process steps. The views can be representative both of outwards and inwards views in such a radial direction R.

Totally as an example, the three holes 18 shown can in particular form a group of holes of seats 16 associated with a corresponding group of spokes of a spoke pattern of the grouped-spokes-type.

The three holes 18 are shown as substantially aligned along the circumferential direction C, and in particular at the two planes T1 and T2 shown in FIG. 1. Furthermore, the three holes 18 are shown of equal diameter and equally spaced in the circumferential direction C. This arrangement of the three holes 18 is merely illustrative, and all of the arrangements of holes of any spoke pattern are possible; furthermore, the holes could also have different diameters.

The views of FIGS. 15-24 are schematic and the wall 28 of the rim 10 is represented as if it were flat, while in practice it typically is not, as highlighted above. Furthermore, the three holes 18 are considered as if they all had the axis perpendicular to the plane of the figure, while in practice they typically do not, as highlighted above.

In such figures, for the sake of simplicity only a first layer 32 and a second layer 38 are shown, the changes to be made in the case of plural first layers 32 and/or of plural second layers 38 being within the capabilities of a person skilled in the art in the light of the description of the same figures and of the previous description of FIGS. 2-6; as well as, in light of the previous description of FIGS. 7 and 10-14, various other changes are within the capabilities of a person skilled in the art.

FIGS. 15-18 illustrate an embodiment of the rim 10 respectively in four steps of an embodiment of the respective process for manufacturing the rim 10.

In a first step of the process for manufacturing the rim 10, the first layer 32 of composite material is positioned in a mould (not shown).

Preferably, the first layer 32 is a continuous strip of composite material having a length at least equal to, but more preferably slightly greater than, the entire circumferential size of the wall 28 of the finished rim 10, which is wound in circumferential direction C in the mould and therefore extends at least 360° about the rotation axis of the rim 10. Preferably, the strip is wound with slight overlapping, at the joint, of the edges at the longitudinal ends thereof.

Alternatively, the first layer 32 can comprise plural strips of composite material adjacent to one another in the circumferential direction C and joined together.

Figure 16:
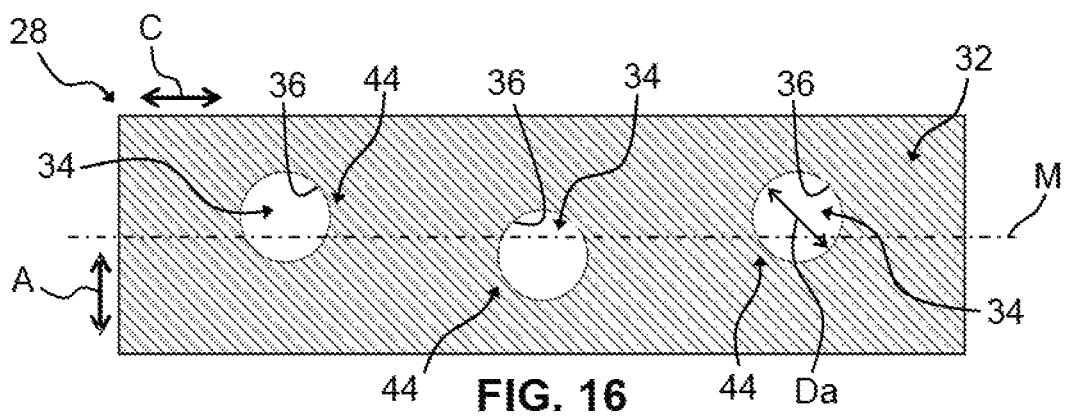

In another manufacturing step of the rim 10, openings 34 are formed, in particular cut, in the first layer 32, as shown in FIG. 16.

In this embodiment, the openings 34 are made in the first layer 32 each at the intended position of a hole 18 of a spoke attachment seat 16, made in other steps of the process described later on (cf. FIG. 18). Therefore, the number of openings 34 along the first layer 32 corresponds to the number of corresponding spoke attachment seats 16 made by the process as a whole.

The size and the positioning of each opening 34 with respect to the size and the positioning of the respective hole 18 in general follow the criteria described above with reference to FIGS. 2-7 and 10-14, but only and purely for clarity of illustration, circular openings 34 are shown, coaxial with the holes 18, and therefore equally spaced in the circumferential direction C, as well as all equally wide.

Considering a nominal diameter Df of the hole 18 of the spoke attachment seat 16 (marked for clarity only in the seat 16 in the middle in FIG. 18), the dimension Da of the associated opening 34 (in this case the diameter thereof) is preferably selected so as to meet the following relationship:

$$Da = M1^* Df \qquad (1)$$

wherein M1 is a coefficient comprised in a range between 1 and 4, more preferably comprised in a range between greater than 1 and less than or equal to 4, even more preferably selected equal to 2.

In other words, each opening 34 preferably extends in a region about the hole 18, by an amount Q1 (marked in FIG. 18 only at the leftmost seat) proportional to the size Df of the hole 18, in particular given by the relationship:

$$Q1 = \frac{1}{2}^* Da - \frac{1}{2}^* Df = \frac{1}{2}^* M1^* Df - \frac{1}{2}^* Df = \frac{1}{2}^*(M1-1)^* Df \qquad (2)$$

The coefficient Q1 is preferably selected taking into account the fact that each opening 34 must be sufficiently large so that its edges 36 are sufficiently far from the region stressed by the spoke tensioned in the hole 18, but also sufficiently small as not to affect the structural characteristics provided to the rim 10 by the first layer 32 in which it is made.

As already stated, each opening 34 through the first layer 32 is preferably made through known processes using a cutting tool, and therefore the structural fibers are preferably mainly sheared at the edge 36 of the openings 34 (FIG. 8).

Figure 17:
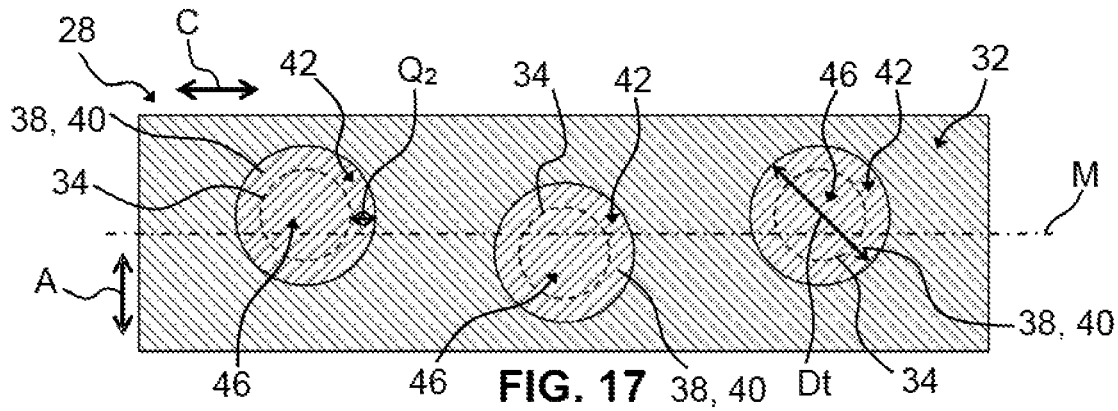

Thereafter, as shown in FIG. 17, the second layer 38 of composite material is applied in the mould.

In this embodiment, the second layer 38 of composite material is applied in the form of a plurality of patches 40. Therefore, the second layer 38 has at least one discontinuity in the circumferential direction C.

Each patch 40 is shaped, sized, and positioned to plug or close an opening 34 in the first layer 32. Each patch 40 closes an opening 34 totally until the holes 18 have been made, but in the finished rim 10 it actually closes the opening 34 apart from the hole(s) contained in the latter. FIG. 17 shows patches 40 having a circular shape and all having the same diameter Dt (marked for clarity only in the rightmost patch 40), selected so as to meet the following relationship:

$$Dt = M2^* Da \qquad (3)$$

wherein Da is the aforementioned diameter of each opening 34 and M2 is a coefficient that takes the following factors into account:
- each patch 40 can be made with sizes corresponding to those of the corresponding opening 34 in the first layer 32 (namely M2 can be unitary), cf. FIG. 7;
- preferably, each patch 40 has a size even only slightly greater with respect to that of the corresponding opening 34, so that a peripheral border 42 of each patch 40 (of suitable size Q2 as described hereinafter) protrudes beyond the corresponding opening 34 and is in contact with a region of the first layer 32 surrounding the opening 34, a region generically indicated in FIG. 16 with reference numeral 44, cf. FIG. 2;
- preferably, although not necessarily, two adjacent patches 40 in the same second layer 38 do not overlap one another.

Preferably, therefore, the coefficient M2 is selected as comprised in a range between 1 and 4, more preferably comprised in a range between greater than 1 and less than or equal to 4, even more preferably it is equal to 3.

In other words, the patch 40 preferably protrudes beyond the opening 34 with a peripheral border 42, of size Q2 (marked in FIG. 17 only at the leftmost patch) proportional to the size of the opening 34, in particular given by the relationship:

$$Q2 = \frac{1}{2}^* Dt - \frac{1}{2}^* Da = \frac{1}{2}^* M2^* Da - \frac{1}{2}^* Da = \frac{1}{2}^*(M2-1)^* Da \qquad (4)$$

In case the patch 40 is made to fit the opening 34 (cf. FIG. 7), the patch 40 is fixed to the first layer 32 at the opening 34 for example through a gluing substance applied on the respective edges, as already stated.

Vice-versa, if like in the case shown (cf. also FIGS. 2-6, 10-14), the patch 40 protrudes beyond the opening 34 and there is the aforementioned peripheral border 42 in the neighbourhood of the edge 36, in contact with a corresponding region 44 of the first layer 32, the copolymerization of the polymeric matrix of the two layers 32, 38 is sufficient to keep the patch 40 in position in the finished rim 10. Furthermore, using pre-impregnated layers 32, 38, their tack is sufficient to keep the patch 40 in position also during manufacturing. It is in any case possible to use a gluing substance.

Figure 18:
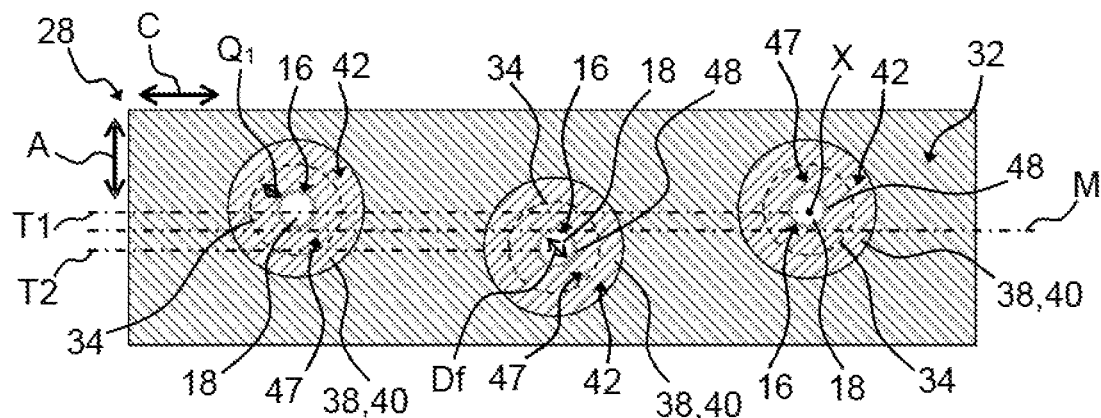

Finally, as shown in FIG. 18, the spoke attachment holes 18 are made in the respective intended position, located inside the edge 36 of a respective opening 34, in the "free" regions 46 of the patches 40 where the first layer 32 is absent.

Therefore, each hole 18 is completely contained in a respective opening 34, looking in the direction of an axis X of the hole 18 (indicated for clarity only in the rightmost hole in FIG. 18).

As already discussed, making the openings 34 by removing a corresponding portion of composite material from the first layer 32 advantageously allows the application of the patches 40 of a material having configuration and properties selected in view of the process of perforation through displacement of structural fibers, which configuration and properties may be different, like in this case, with respect to those required in the regions of the rim 10 not involved by the spoke attachment seats 16.

Therefore, the holes 18 are preferably, but not necessarily, formed using a pointed but not sharp tool, such as to displace the structural fibers inside the polymeric matrix that is not yet polymerized without cutting them, for example according to the process described in document EP 2 422 959 A1 cited above. The second layer 38 therefore comprises, at each spoke attachment seat 16, an amassment 48 of fibers in the neighbourhood of the hole 18, cf. FIG. 9.

As already stated, furthermore, preferably, the second layer 38 comprises woven structural fibers oriented at +/−45° with respect to the circumferential direction C of the rim 10.

As already stated, furthermore, preferably the fiber density of the material of the first layer 32 is greater than the fiber density of the material of the second layer 38.

After making the spoke attachment seats 16, and after the possible arrangement in the mould of one or more "third" layers of composite material in other areas of the radial section of the rim 10, the component being machined is subjected to a conventional polymerization or curing process so as to harden the composite material of the individual layers and to harden the laminate of the layers, through co-cross-linking or co-hardening of the thermosetting or thermoplastic material, respectively, of the respective matrices. Such a process is totally conventional and within the capabilities of those skilled in the art and therefore is not described in detail.

Furthermore, it should be emphasized that the steps described above with reference to FIGS. 15-18 do not necessarily have to be carried out in the sequence outlined above. In particular, the creation of the holes 18 and of the openings 34 can take place inside or outside the mould, the first and second layers can be arranged in the mould in any order.

FIGS. 15-18 show openings 34, patches 40 and spoke attachment holes 18 all concentric with one another, but as discussed above, the axis X of the hole 18, the axis Y of the opening 34 and the axis Z of the patch 40 can be mutually positioned in various manners, cf. FIG. 10-14.

It is sufficient for each opening 34 to be covered or closed by a patch 40, so that there is the free region 46 of the patch 40 in which to form the hole 18, namely it is sufficient for the hole 18 to be located inside the edge 36 of an opening 34 in the first layer 32, preferably with the interposition of the aforementioned region 47 of size Q1.

FIGS. 19-22 and 24-25 illustrate that, as already stated, according to the invention it is possible to provide for a second layer 38 (or more) of composite material in the form of patches of suitable dimensions, each positioned at plural holes 18 of spoke attachment seats 16, especially if sufficiently close to one another, once again emphasizing that (in embodiments not shown) it is possible to provide for some openings to be closed by their own patch and other openings to be closed by a single shared patch.

Figure 19:
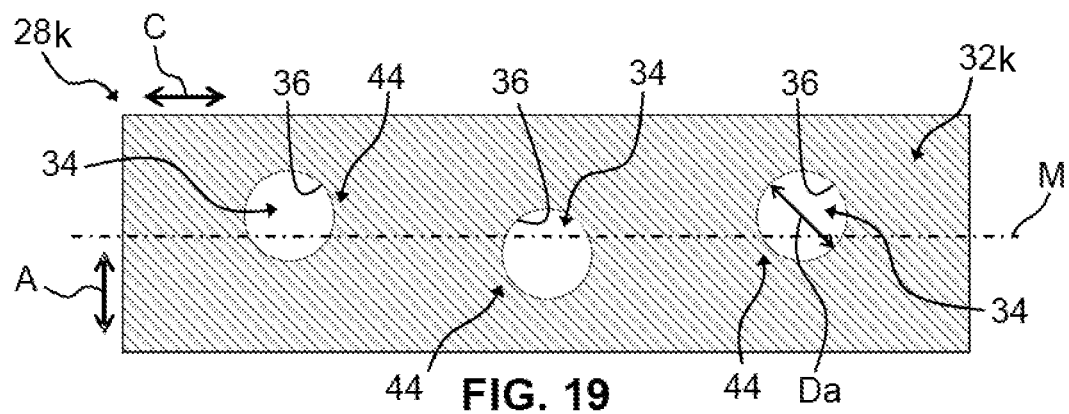
FIGS. 19-20 are schematic views of a portion of another embodiment of the rim of FIG. 1 during different steps of an embodiment of a process for manufacturing it.
Figure 20:
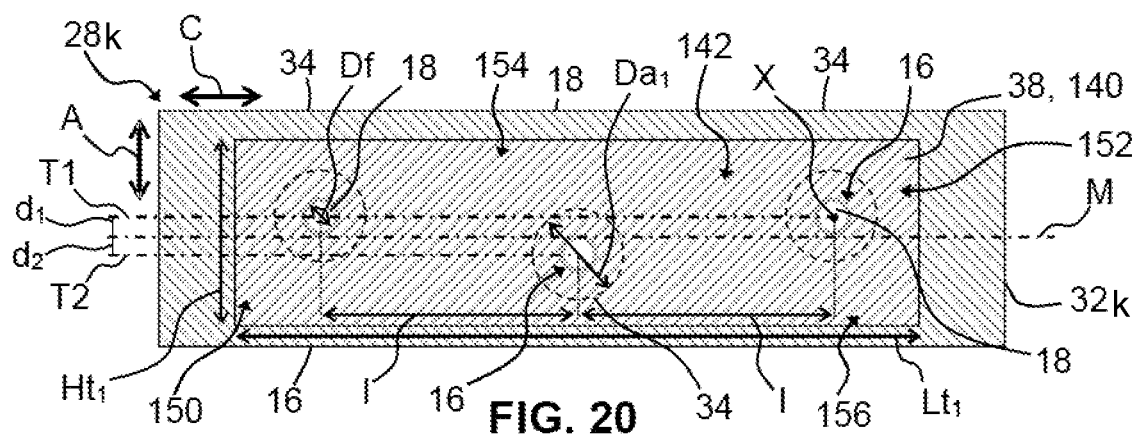

As an example, FIGS. 19 and 20 illustrate an embodiment of the invention that differs from the previous one in that a single patch 140 made of composite material is positioned at a group of plural openings 34 formed in the first layer 32 of composite material, each opening 34 being at the intended position of a hole 18 of a spoke attachment seat 16; the patch 140 is therefore at a group of holes 18. Once again, three holes 18 are shown merely as an example at three circular openings 34 in the first layer 32.

The sizing of the circular openings 34 preferably takes place according to the relationships (1) and (2).

The sizes of the patch 140 are suitably selected so as to completely plug or close the group of openings 34 made in the first layer 32, preferably with a certain margin. Generalizing to a group of N openings 34 and considering an oblong-shaped patch 140, in particular rectangular as shown, the sizes of the patch 140 are preferably selected based on the following relationships (assuming for the sake of simplicity equal and equidistant openings):

$$Ht1 = M3*Da + (d1+d2) \quad (5)$$

$$Lt1 = M4*Da + (N-1)*I \quad (6)$$

wherein Ht1 and Lt1 are respectively width and length of the patch 140, Da is the diameter of the openings 34, d1 and d2 are the distances respectively of the planes T1 and T2 from the median plane M, I is the distance between centers of the openings 34, and M3 and M4 are coefficients that take the following factors into account:

it is desirable for the patch 140 to comprise, along the entire perimeter thereof, a peripheral border 142 that protrudes beyond the minimum imaginary surface that encloses all of the openings 34 and is in contact with a region (unnumbered) of the first layer 32 surrounding the openings 34; moreover, for the purposes of the present invention it is sufficient for the aforementioned border 142 to be present only at longitudinal ends 150, 152 of the patch 140 or, alternatively, only at transversal ends 154, 156 of the patch 140;

preferably, but not necessarily, the patch 140, positioned at the group of holes 18, does not overlap another adjacent patch (not shown) in the same second layer 38, positioned for example at a second group (not shown) of spoke attachment holes 18 or at a single spoke attachment hole 18.

The coefficients M3 and M4 can take up values selected independently from one another. Preferably, the values of the coefficients M3 and M4 are selected equal to each other, preferably comprised in a range between 1 and 4, more preferably comprised in a range between greater than 1 and less than or equal to 4, even more preferably equal to 2.

Preferably, the patch 34 extends beyond said imaginary surface by an amount Q2 given by a more complex relationship than relationship (4), but that follows the same criteria.

The changes to be made to the sizes of the patch 140 are within the capabilities of a person skilled in the art in the case of openings 34 of different shape and/or openings 34 with a different distance between centers I and/or at a different distance from the median plane M of the rim 10 with respect to what is shown and described.

Figure 21:
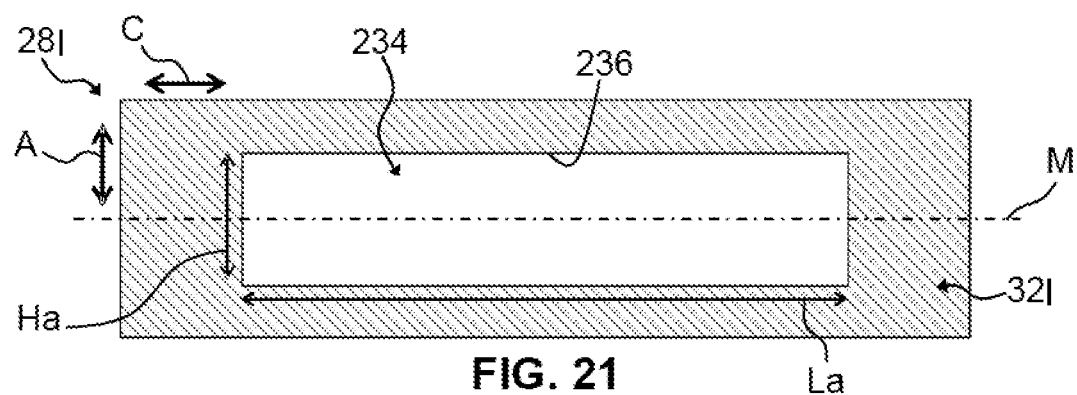
FIGS. 21-22 are schematic views of a portion of another embodiment of the rim of FIG. 1 during different steps of an embodiment of a process for manufacturing it.
Figure 22:
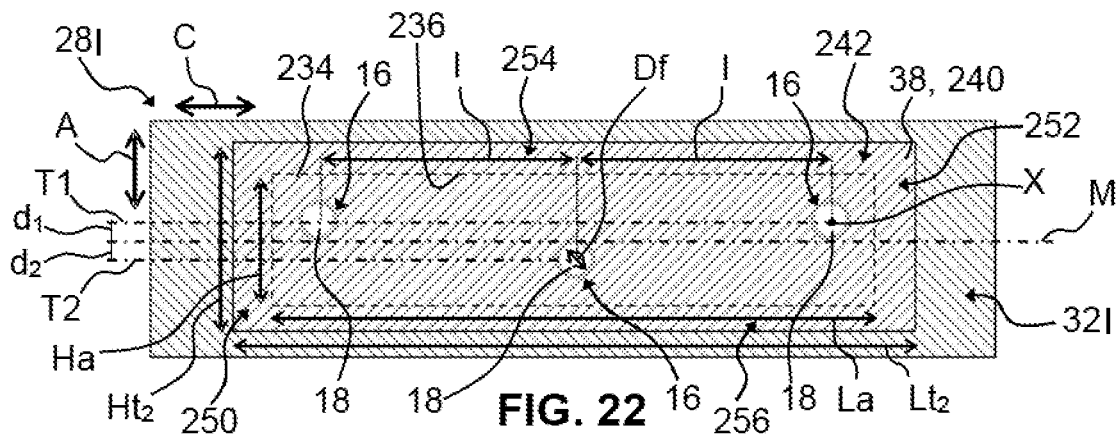

Still as an example, FIGS. 21 and 22 show another embodiment of the invention, which differs from the previous ones in that a single patch 240 made of composite material is arranged to close a single opening 234 (FIG. 21) formed, preferably cut, in the first layer 32 of composite material in a position such as to contain a group—three in the example shown—of holes 18 of spoke attachment seats 16.

Generalizing to a number N of spoke attachment seats 16 and considering the aforementioned nominal diameter Df of every hole 18, the opening 234 is sized, when rectangular in shape as shown, based on the following relationships (considering for the sake of simplicity equal and equidistant openings):

$$Ha = M5*Df + (d1+d2) \quad (7)$$

$$La = M6*Df + (N-1)*I \quad (8)$$

wherein Ha and La are respectively width and length of the opening 234, d1 and d2 are the distances, respectively, of the planes T1 and T2 from the median plane M, I is the distance between centers of the holes 18, and M5 and M6 are coefficients that can take up values selected independently from one another, but the values of which are preferably selected as equal to each other, preferably comprised in a range between 1 and 4, more preferably comprised in a range between more than 1 and less than or equal to 4, even more preferably equal to 2.

The patch 240 is made of suitable sizes such as to completely cover or close the opening 234 in the first layer 32. In the case shown, the patch 240 is oblong-shaped, in particular rectangular, and the sizes thereof are determined based on the following relationships:

$$Ht2 = M7*Ha \quad (9)$$

$$Lt2 = M8*La \quad (10)$$

wherein Ht2 and Lt2 are respectively width and length of the patch 240, Ha and La are the aforementioned sizes of the opening 234 and M7 and M8 are coefficients that take the following factors into account:

the patch 240 can be made with sizes corresponding to those of the opening 234 in the first layer 32, cf. FIG. 7;

it is moreover desirable for the patch 240 to comprise, along the perimeter thereof, a peripheral border 242 that protrudes beyond the opening 234 and is in contact with a region (not indicated) of the first layer 32 surrounding the opening 234; however, for the purposes of the present invention it is sufficient for the aforementioned border 242 to be present only at longitudinal ends 250, 252 of the patch 240 or, alternatively, only at transversal ends 254, 256 of the patch 240;

preferably, but not necessarily, the patch 240, positioned to contain the group of holes 18 of the spoke attachment seats 16, does not overlap another adjacent patch (not shown) in the same second layer 38, for example positioned at a second group (not shown) of spoke attachment holes 18 or at a single spoke attachment hole 18.

The coefficients M7 and M8 can take up values selected independently from one another. Preferably, the values of the coefficients M7 and M8 are selected as equal to each other, preferably comprised in a range between 1 and 2, more preferably comprised in a range between greater than 1 and less than or equal to 2, even more preferably equal to 1.5.

As can easily be verified, every opening 234 also extends beyond the holes 18 that are outermost in every direction, namely beyond the aforementioned imaginary geometric surface, by an amount proportional to the size of the hole.

Also in this case, the changes to be made to the shape and size of the patch 240 are within the capabilities of a person skilled in the art in the case of an opening 234 of different shape, size and/or position.

Figure 23:
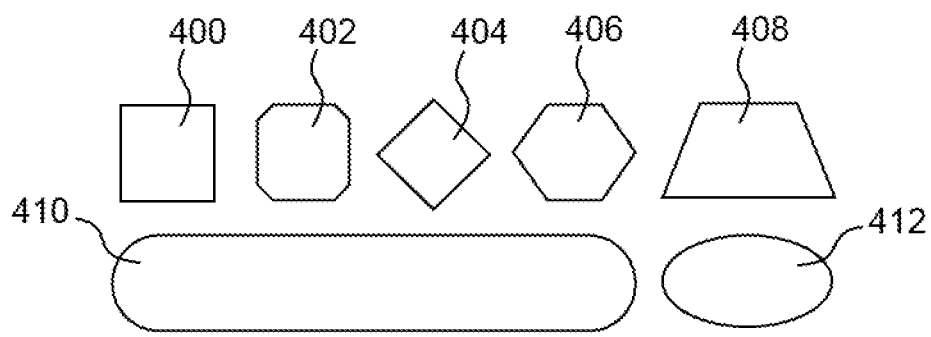
FIG. 23 is a schematic illustration of parts of rim according to further exemplary embodiments of the invention.

Both the openings 34, 234, 334 and the patches 40, 140, 240 in all of the embodiments of the invention, can have different shapes from the circular and rectangular ones shown. Merely as a non-limiting example, FIG. 23 schematically shows other possible shapes that the openings 34, 234, 334 and/or the patches 40, 140, 240 could take up: a square shape 400, an octagonal shape 402, a rhomboidal shape 404, a hexagonal shape 406, a trapezoidal shape 408, an oblong shape with rounded ends 410, and an oval shape 412.

As a further non-limiting example, FIGS. 24 and 25 show a fourth embodiment of the invention, wherein the first layer 32 comprises two adjacent and spaced apart strips 332, 333 of composite material, each preferably extending at least 360° about the rotation axis of the rim.

In this way, an annular opening 334 is formed, extending 360° about the rotation axis of the rim.

In this case, the annular opening 334 comprises all of the spoke attachment holes 18, in particular all of the holes aligned along a plane coinciding with or parallel to the median plane M of the rim 10.

In the case shown, the second layer 38 of composite material is a continuous strip 340 or single patch 340 of composite material, having a length at least equal to, but more preferably slightly greater than, the circumferential size of the entire wall 28 of the finished rim 10, which is wound in the circumferential direction C in the mould and therefore extends at least 360° about the rotation axis of the rim. Preferably the strip is wound with slight overlapping, at the joint, of the edges at the longitudinal ends thereof.

Such a continuous strip 340 also has a respective peripheral border 342 that protrudes beyond the opening 334.

Such a continuous strip 340 or single patch 340 can also be used when there are plural openings 34 instead of the annular opening 334, each individually configured to contain a single hole 18 or more than one hole 18.

Those skilled in the art will understand that, vice-versa, all of the considerations outlined above concerning the other embodiments are valid for the embodiment of FIGS. 24-25, mutatis mutandis.

As stated earlier, the teachings according to the present invention also have advantageous application at other holes of the rim 10, like for example the openings 26 for access to the nipples typically formed in the bottom 22 of the channel 12 or upper bridge of the rim, or an insertion hole of an inflation valve.

It should be recognized that with FIGS. 15-18 and 24-25 a process for manufacturing a bicycle wheel rim 10 made at least partially of stratified composite material as described in the introductory part of the present disclosure has also been fully illustrated and described.

In the various embodiments of the rim 10, the join of a strip (of the first or of the second layer(s)) is preferably in a position angularly spaced from the joint of a strip in an adjacent (first, second or other) layer in the stratified composite material.

In the various embodiments, if the rim has spoke seats aligned along two planes T1 and T2 so spaced apart that the respective holes are completely at opposite sides with respect to a certain plane, then the second layer, when in the form of a strip extending 360°, can have a discontinuity in the direction to the circumferential direction transversal of the rim (in the axial direction). In such an embodiment, the second layer actually comprises two strips, one used to close the openings corresponding to the spoke attachment seats aligned along the first plane T1, and the other used to close the openings corresponding to the spoke attachment seats aligned along the second plane T2.

The openings and/or the patches, when oblong in shape, have been shown as having their major size aligned with the circumferential direction C of the rim. In other embodiments, however, the openings and/or the patches, when oblong in shape, could have their major size extending according to a direction that forms an angle of less than 45° with the circumferential direction C of the rim. This can be useful for example if the spoke attachment seats are in groups of two or more seats locally aligned according to such a direction.

The above is a description of various embodiments of inventive aspects, and further changes can be made without departing from the scope of the present invention. The shape and/or size and/or location and/or orientation of the various components and/or the succession of the various steps can be changed. The functions of an element or module can be carried out by two or more components or modules, and vice-versa. Components shown directly connected to or contacting each other can have intermediate structures arranged in between them. Steps shown directly following each other can have intermediate steps carried out between them. The details shown in a figure and/or described with reference to a figure or to an embodiment can apply in other figures or embodiments. Not all of the details shown in a figure or described in a same context must necessarily be present in a same embodiment. Features or aspects that turn out to be innovative with respect to the prior art, alone or in combination with other features, should be deemed to be described per se, irrespective of what is explicitly described as innovative.

What is claimed is:

1. A bicycle wheel rim at least partially made of layers of a stratified composite material comprising structural fibers incorporated in a polymeric matrix,
wherein at least one opening passes through at least one first layer of the stratified composite material,
wherein at least one spoke attachment hole has a perimeter defined by (i) at least one second layer of the stratified composite material, or (ii) at least one patch provided in said at least one second layer and that partially closes said at least one opening, and wherein said at least one spoke attachment hole is completely contained in said at least one opening when looking in a direction of an axis common to said at least one opening and said at least one spoke attachment hole.

2. The rim according to claim 1, wherein said at least one first layer is a continuous strip of composite material extending at least 360° about a rotation axis (A) of the rim or it comprises two such strips arranged adjacent and spaced apart.

3. The rim according to claim 1, wherein said at least one opening is circle-shaped or oblong-shaped, with a major size (La) thereof aligned with or forming an angle of less than 45° with a circumferential direction (C) of the rim.

4. The rim according to claim 1, wherein said at least one second layer is a continuous strip of composite material extending for at least 360° about a rotation axis (A) of the rim.

5. The rim according to claim 4, wherein said at least one opening is an annular opening that extends 360° about the rotation axis (A) of the rim substantially in a circumferential direction (C), and substantially astride of a median plane (M) of the rim, said at least one hole comprises a plurality of holes completely contained in the annular opening.

6. The rim according to claim 1, wherein said at least one patch includes a plurality of patches with at least one patch that closes a respective opening in said at least one first layer, wherein a plurality of holes are made in each patch of said plurality of patches and completely contained in the respective opening.

7. The rim according to claim 6, wherein at least one patch of said plurality of patches is circular in shape or oblong-shaped, with a major size (Lt1, Lt2) thereof aligned with or forming an angle smaller than 45° with a circumferential direction (C) of the rim.

8. The rim according to claim 1, wherein said at least one patch includes a plurality of patches with at least one patch that closes a respective opening in said at least one first layer, wherein a single hole is made in each patch of said plurality of patches and completely contained in the respective opening.

9. The rim according to claim 1, wherein said at least one patch includes a plurality of patches with at least one patch that closes plural respective openings in said at least one first layer, wherein a plurality of holes are made in each patch of said plurality of patches and each completely contained in a different one of said plurality of respective openings.

10. The rim according to claim 1, wherein said at least one patch includes a plurality of patches and at least one patch or a continuous strip of said at least one second layer comprises a peripheral border that protrudes beyond said one or more openings closed thereby in all directions in the case of a patch and in both the transversal directions in the case of a continuous strip.

11. The rim according to claim 1, wherein said at least one first layer comprises unidirectional structural fibers aligned along a circumferential direction (C) of the rim, and/or wherein said at least one second layer comprises woven structural fibers oriented at +/−45° with respect to the circumferential direction (C) of the rim.

12. The rim according to claim 1, wherein said at least one opening comprises an edge at which the structural fibers of the respective first layer are mainly sheared and/or wherein said at least one second layer has an amassment of structural fibers in a neighbourhood of said at least one hole.

* * * * *